US012378631B2

(12) United States Patent
Yopps et al.

(10) Patent No.: US 12,378,631 B2
(45) Date of Patent: Aug. 5, 2025

(54) MULTI-STAGED HIGH TEMPERATURE PRESSURE OXIDATION PROCESS FOR DOUBLE REFRACTORY PRECIOUS METAL-CONTAINING MATERIALS

(71) Applicant: Nevada Gold Mines LLC, Elko, NV (US)

(72) Inventors: Steven Wayne Yopps, Elko, NV (US); John Williams Langhans, Jr., Spring Creek, CO (US); Devy Dyson, Kaysville, UT (US)

(73) Assignee: Nevada Gold Mines LLC, Elko, NV (US)

( * ) Notice: Subject to any disclaimer, the term of this patent is extended or adjusted under 35 U.S.C. 154(b) by 410 days.

(21) Appl. No.: 17/902,317

(22) Filed: Sep. 2, 2022

(65) Prior Publication Data
US 2023/0077051 A1    Mar. 9, 2023

Related U.S. Application Data

(60) Provisional application No. 63/275,301, filed on Nov. 3, 2021, provisional application No. 63/275,297, filed (Continued)

(51) Int. Cl.
  *C22B 3/08*     (2006.01)
  *C22B 3/44*     (2006.01)
  *C22B 11/00*    (2006.01)

(52) U.S. Cl.
  CPC .................. *C22B 3/08* (2013.01); *C22B 3/44* (2013.01); *C22B 11/04* (2013.01); *Y02P 10/20* (2015.11)

(58) Field of Classification Search
  CPC ... C22B 3/08; C22B 11/04; C22B 3/44; Y02P 10/20
  See application file for complete search history.

(56) References Cited

U.S. PATENT DOCUMENTS 4,578,163 A   3/1986  Kunter et al.
5,250,193 A  10/1993  Sawicki et al.
(Continued)

OTHER PUBLICATIONS

Birich et al.; "Kinetic Investigation and Dissolution Behavior of Cyanide Alternative Gold Leaching Reagents"; May 10, 2019; Scientific Reports, pp. 1-10) (Year: 2019).*

(Continued)

*Primary Examiner* — Adil A. Siddiqui
(74) *Attorney, Agent, or Firm* — Sheridan Ross P.C.

(57) ABSTRACT

A precious metal leaching method includes providing a slurried feed, comprising (i) in the solid phase, a refractory sulfide-containing material, the material comprising at least about 0.05 oz/tonne of a precious metal, at least about 0.75 wt. % sulfides, optionally at least about 0.1 wt. % feldspar (i.e., muscovite), and at least 0.3 wt. % preg-robbing carbonaceous material; and oxidizing the sulfide-containing material at more than about 240° C. and super-atmospheric pressure to oxidize at least most of the carbonaceous material and optionally convert at least most of the sulfide sulfur to sulfate sulfur and form an oxidized precious metal-containing material, wherein at least one of the following is performed during oxidizing: maintaining a pH of at least about pH 1.5; maintaining at least about 98.5% of the feldspar (i.e., muscovite) in the solid phase; maintaining a dissolved cupric ion concentration of at least about 0.25 g/L; and maintaining the slurried feed under subcritical or supercritical water operating conditions.

27 Claims, 17 Drawing Sheets

Related U.S. Application Data on Nov. 3, 2021, provisional application No. 63/255,273, filed on Oct. 13, 2021, provisional application No. 63/255,254, filed on Oct. 13, 2021, provisional application No. 63/241,693, filed on Sep. 8, 2021, provisional application No. 63/241,689, filed on Sep. 8, 2021, provisional application No. 63/240,281, filed on Sep. 2, 2021.

(56) References Cited

U.S. PATENT DOCUMENTS

| | | | |
|---|---|---|---|
| 5,792,235 | A | 8/1998 | Kohr |
| 8,262,770 | B2 * | 9/2012 | Hillier .................. C22B 1/00 |
| | | | 75/744 |
| 2008/0069723 | A1 | 3/2008 | Traanquilla |
| 2009/0071295 | A1 | 3/2009 | Gorain et al. |

OTHER PUBLICATIONS

U.S. Appl. No. 63/173,803, filed Apr. 12, 2021, Haneman et al.
"Air Products and Chemicals, Inc., Water Oxidation Study," ABB LCI Project No. 06699, Feb. 1991, 85 pages.
"Analyst and Inventor Day" Polymetal International PLC, Nov. 9, 2020, 63 pages.
"POX Workshop-London" Polymetal International PLC, Feb. 11, 2019, 61 pages.
"Uranium Extraction Technology," International Atomic Energy Agency, Vienna, Technical Report Series No. 359, 1993, 380 pages, Uploaded in 3 Parts.
Barnes, "Evaluation of Tubular Reactor Designs for Supercritcal Water Oxidation of U.S. Deportment of Energy Mixed Waste," Idaho National Engineering Laboratory, Lockheed Idaho Technologies Company, Idaho Falls, ID, Dec. 1994, 53 pages.
Berezowsky et al., The Commercial Status of Pressure Leaching Technology, Journal of the Minerals, Metals & Materials Society, Feb. 1991, vol. 43(2), pp. 9-15, 7 pages.
Burchell, "Carbon Materials for Advanced Technologies," Pergamon, 1999, 566 pages, uploaded in 3 parts.
Chengfu et al., "Treatment of Refractory Gold Ore by Supercritical Water Oxidation," The Chinese Journal of Process Engineering, Oct. 2004, vol. 4(5), 6 pages.
Demull et al., "Opportunities for Precious Metals Toll Processing and Copper Concentrate Processing in Nevada," University of Nevada, Reno, Nevada Bureau of Mines and Geology Report 57, 2018, 48 pages.
Dyson et al., "Near-Technical Limit Gold Recovery from a Double Refractory Carlin-Type Ore After Pre-treatment by High-Temperature Pressure Oxidation," Mining, Metallurgy & Exploration, 2022, 8 pages.
Fairley, "A Survey of Conventional and Novel Processes for the Treatment of Refractory Gold," The University of British Columbia, Dept. of Metals and Materials Engineering, Thesis, Aug. 1998, 103 pages.
Levec et al., "Catalytic wet-air oxidation processes: A review," ScienceDirect, Catalysis Today, 2007, vol. 124, pp. 172-184.
Monhemius, "Recent advances in the treatment of refractory gold ores," Dept. of Mineral Resources Engineering, Royal School of Mines, Imperial College of Science and Technology, London SW7 2BP, United Kingdom, Jul. 31, 2015, pp. 281-302, 23 pages.
Oestreich, "Mineral Alterations in Supercritical Water: An Overview of Bureau of Mines Research," Bureau of Mines, U.S. Dept. of the Interior, Nov. 1988, 26 pages.
Penner et al., "Mineral Carbonation: Energy Costs of Pretreatment Options and Insights Gained from Flow Loop Reaction Studies," Albany Research Center, Office of Fossil Energy, US DOE/ARC-2004-042, 18 pages.
Simmons, "Pressure Oxidation Process Development for Treating Carbonaceous Ores at Twin Creeks," Randol Gold Forum, 1996, pp. 199-208.
Walther, "Mineral solubilities in supercritical H2O solutions," Pure & Applied Chemistry, Dec. 1986, vol. 58(12), pp. 1585-1598.
Zhang et al., "Study on Heterogeneous Catalyst Classification Based on CWAO Process of Organic Waste-Water," 4th International Symposium on Resource Exploration and Environmental Science, IOP Conf. Series: Earth and Environmental Science, 2020, vol. 514, 8 pages.
International Search Report and Written Opinion for International (PCT) Application No. PCT/US2022/042497, dated Dec. 8, 2022 11 pages.

* cited by examiner

MULTI-STAGED HIGH TEMPERATURE PRESSURE OXIDATION PROCESS FOR DOUBLE REFRACTORY PRECIOUS METAL-CONTAINING MATERIALS

CROSS REFERENCE TO RELATED APPLICATION

The present application claims the benefits of U.S. Provisional Application Ser. No. 63/240,281, filed Sep. 2, 2021; 63/241,689 and 63/241,693, both filed Sep. 8, 2021; 63/255,273 and 63/255,254, both filed Oct. 13, 2021; and 63/275,297 and 63/275,301, both filed Nov. 3, 2021, all entitled "MULTI-STAGED HIGH TEMPERATURE PRESSURE OXIDATION PROCESS FOR DOUBLE REFRACTORY PRECIOUS METAL-CONTAINING MATERIALS", each of which is incorporated herein by this reference in its entirety.

FIELD

The disclosure relates generally to hydrometallurgical precious metal recovery and particularly to high temperature pressure oxidation of precious metal-containing materials.

BACKGROUND

Gold ores are treated by a variety of processes. All hydrometallurgical gold recovery processes rely on leaching relatively low concentrations of gold from ores using lixiviants, primarily cyanide solutions. Ores that contain gold extracted by comminuting and followed by leaching with cyanide solution are known as "oxide" or "free milling" ores. However, gold recovery from some ore types by direct cyanide leaching is not effective, with as little as 30 percent, or even lower, of the gold content of the ore being amenable to cyanide leaching. These ores are commonly termed "refractory" ores. Poor gold recovery from refractory ores is typically caused by the gold being occluded in sulfide mineral grains (usually arsenopyrite and/or pyrite grains) so that the gold cannot react with the cyanide leach solution or by dissolved gold being adsorbed by carbonaceous material present in the ore (this phenomenon is known as "preg robbing") The term "carbonaceous material" (CM) refers to carbon-containing materials including, humic acid, hydrocarbons, graphite, and naturally occurring activated carbon. CM does not include inorganic carbonate carbon. Ores having both types of metallurgical problems (occluded and preg robbing) are commonly known as "double refractory" ores. Further losses in gold recovery can occur when dissolved gold is occluded by inorganic precipitates which typically occur during autoclave treatment of refractory gold ores.

A common method of treating refractory gold ores is by pressure oxidation in autoclaves at super atmospheric pressure to oxidize sulfide sulfur. Autoclave reactor designs compatible with oxygen injection at a molecular oxygen overpressure in the range of about 50 psi to 250 psi and at a pH operating range of pH 0.5 to pH 8, and temperature up to 225° C. and 60 minutes of residence time are common. Pressure oxidation oxidizes sulfide minerals, rendering the gold amenable to cyanide leaching. The gold is dissolved by cyanidation and concentrated by adsorption onto activated carbon (either in adsorption columns or in carbon added to the leaching process (known as Carbon-In-Leach ("CIL") or Carbon-In-Pulp ("CIP") techniques) or onto a resin (known as the Resin-In-Pulp ("RIP") technique). The adsorbed gold is eluted from the loaded carbon or resin by washing and stripping with ammonia, nitric acid, hydrochloric acid, caustic solution, cyanide, and/or steam. The gold is then converted to a solid from the eluate by electrowinning (electroplating of gold onto cathodes), precipitation and filtration, or cementation.

Gold ores and flotation concentrates are increasingly double-refractory, and roasting is the pretreatment step currently preferred ahead of cyanide/carbon-in-leach (CIL). Roasting can simultaneously oxidize the ore's gold bearing sulfides and the naturally occurring CM. However, roasting pre-treatment of arsenian pyrite ores can yield hematite grain morphologies that rarely release more than 80% of their contained gold during CIL.

Pressure oxidation (POx) pre-treatment typically yields hematite morphologies that are more amenable to CIL particularly when pyrite grains have a greater amount of arsenic in solid solution. However, pressure oxidation is incompatible with the need to oxidize the preg-robbing carbonaceous material from double-refractory ores. Pressure oxidation reactors for the treatment of double-refractory gold flotation concentrates are known to operate at 240° C. with a residence time (RT) of at least 3 hours to realize relatively complete oxidation of CM. Mass reduction by flotation allows the cost of the reactor circuit to be maintained within reason given the extended RT.

SUMMARY

These and other needs are addressed by the various embodiments and configurations of the present disclosure.

In an embodiment of the disclosure, a method is provided that can include the steps of:
  (a) providing a slurried feed, comprising in the solid phase, a refractory sulfide-containing material, the material comprising at least about 0.05 oz/tonne (e.g., 1.7 g/tonne) of a precious metal, at least about 0.75 wt. % sulfides, optionally at least about 0.1 wt. % feldspar (e.g., mica or muscovite), and at least 0.3 wt. % preg robbing carbonaceous material;
  (b) optionally oxidizing the sulfide-containing material at less than 240° C. and super-atmospheric pressure (e.g., an operating pressure greater than atmospheric pressure) to convert at least most of the sulfide sulfur to sulfate sulfur and substantially stabilize ferric and ferrous iron in solution (e.g., maintain typically at least most and more typically at least about 75 mole % of leached dissolved iron in the leach solution in the form of hematite or maintain no more than about 30 mole %, and more typically no more than about 20 mole % of the iron in the leach solution in the form of basic ferric sulfate or maintain a total concentration of ferric iron in the leach solution typically of at least about 5 g/L and more typically at least about 8 g/L);
  (c) oxidizing the sulfide-containing material at more than about 240° C. and super-atmospheric pressure to oxidize at least most of the carbonaceous material and form an oxidized precious metal-containing material, wherein at least one of the following is performed during the second stage that oxidizes carbonaceous matter:
    (b1) maintaining a pH of at least about pH 1.5 (with acid neutralizing agents if required);
    (b2) maintaining muscovite or mica dissolution to no more than about 1% of the mineral present.
    (b3) maintaining a dissolved cupric ion concentration of at least about 0.25 g/L; and (b4) maintaining the slurried feed under supercritical water operating conditions; and (c) thereafter recovering the precious metal from the oxidized precious metal-containing material to form a precious metal product and a barren residue, wherein no more than about 25% of the precious metal in the material remains in the barren residue.

In an embodiment of the disclosure, a method can include the steps of:

(a) providing a slurried feed, comprising (i) in the solid phase, a refractory sulfide-containing material, the material comprising at least about 0.05 oz/tonne of a precious metal, at least about 0.75 wt. % sulfides, optionally at least about 0.1 wt. % feldspar, and at least 0.3 wt. % preg-robbing organic carbonaceous material;

(b) oxidizing the sulfide-containing material at less than 240° C. and super-atmospheric pressure to convert at least most of the sulfide sulfur to sulfate sulfur and substantially stabilize ferric and ferrous iron in solution;

(c) oxidizing at least most of the carbonaceous material to form an oxidized precious metal-containing material; and (d) thereafter recovering the precious metal from the oxidized precious metal-containing material to form a precious metal product and a barren residue, wherein no more than about 25% of the precious metal in the material remains in the barren residue.

In an embodiment of the disclosure, a method can include the steps of:

(a) providing a slurried feed, comprising (i) in the solid phase, a refractory sulfide-containing material, the material comprising at least about 0.05 oz/tonne of a precious metal, at least about 0.75 wt. % sulfides, optionally at least about 0.1 wt. % feldspar, and at least 0.3 wt. % preg-robbing organic carbonaceous material;

(b) oxidizing the carbonaceous material in the slurried feed and form an oxidized precious metal-containing material, wherein, during oxidizing of the carbonaceous material in the slurried feed, the slurried feed has a pH of at least about pH 1.5 and a dissolved cupric ion concentration of at least about 0.25 g/L; and (c) thereafter recovering the precious metal from the oxidized precious metal-containing material to form a precious metal product and a barren residue, wherein no more than about 25% of the precious metal in the material remains in the barren residue.

The precious metal can comprise gold and the feldspar can comprise mica.

At least about 98.5% of the muscovite is maintained in the solid phase during oxidizing of the sulfide-containing material.

The present disclosure can provide several advantages depending on the particular configuration. The present disclosure can provide a robust hydrometallurgical process that can treat many ore types and achieve maximum gold recovery, even up to the quartz/silica locking limit. As expected, the oxidation kinetics for CM are enhanced at higher temperatures, resulting in a reduction in the RT required to achieve the minimum oxidation target of greater than 80%. Specifically, a second stage temperature of 300° C. can provide robust performance when treating whole (or unfloated) ore without additives. Multi-valent cation catalyzation may enhance the ability to use nickel reactor designs at temperatures up to 270° C. By way of example, cupric ion has been found to catalyze the oxidation rate, and significant CM oxidation can be achieved at 270° C. within 60 minutes of RT. Based on the state-of-the-art in commercial reactor design and the exponential increase in cost for novel reactors compatible with higher temperatures (e.g., under subcritical water operating conditions), the benefits of high temperature pressure oxidation can be realized either at a maximum temperature of 270° C. when using nickel reactor designs or a maximum RT of 20 minutes and even in some applications less than one minute, when considering novel, higher-temperature reactors.

These and other advantages will be apparent from the disclosure contained herein.

The terms "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "Advanced Oxidation Processes" or AOP refers to a set of chemical treatment procedures designed to remove organic (and sometimes inorganic) materials in water and wastewater by oxidation through reactions with hydroxyl radicals (OH). In real-world applications of wastewater treatment, however, this term usually refers more specifically to a subset of such chemical processes that employ ozone ($O_3$), hydrogen peroxide ($H_2O_2$), permanganate, persulfate, and/or peroxydisulfate. Other strong oxidants may also be employed. One such type of process is called in situ oxidation.

The term "disseminated carbonaceous material" or (DCM) refers to carbonaceous material finely disseminated in otherwise non-carbonaceous particles, such as particles of quartz or other gangue particles.

The term "feldspar" refers to a group of rock-forming aluminum tectosilicate minerals, containing sodium, calcium, potassium or barium. The feldspar group of minerals includes tectosilicates, silicate minerals in which silicon ions are linked by shared oxygen ions to form a three-dimensional network. The most common members of the feldspar group are the plagioclase (sodium-calcium) feldspars and the alkali (potassium sodium) feldspars.

The term "inorganic carbon" refers primarily to the metallic carbonates, such as calcium carbonate and sodium carbonate, and to binary compounds of carbon such as carbon oxides, carbides, carbon disulfides, etc., ternary compounds, such as metallic cyanides, metallic carbonyls, carbonyl sulfides, etc.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The term "mica" refers to a group of minerals whose outstanding physical characteristic is that individual mica crystals split into extremely thin elastic plates. This characteristic is described as perfect basal cleavage. The mica group includes 37 phyllosilicate minerals. All crystallize in the monoclinic system, with a tendency towards pseudohexagonal crystals and are similar in structure but vary in chemical composition.

The term "precious metal" refers to gold and silver and the platinum group metals (i.e., ruthenium, rhodium, palladium, osmium, iridium, and platinum), with gold and silver being more common, and gold even more common.

The term "supercritical water" refers to water at a temperature (e.g., about 647.096° K or 374° C.) and pressure (e.g., about 22.064 MPa or 217.755 atm) above its critical point, where distinct liquid and gas phases do not exist, but below the pressure required to compress it into a solid. Supercritical fluids possess unique properties which differ markedly from fluid properties at ambient temperatures and pressures. Differences between properties of liquid and gas phases diminish as a substance approaches the critical point. At the critical point, all differences disappear, and the phases become mutually soluble. Commonly, properties of the supercritical phase are intermediate to the properties of the liquid and gas. Supercritical fluids effuse through porous solids like a gas, overcoming the mass transfer limitations that slow liquid-based oxidant transport through the oxidation process products of the shrinking core, are much superior to gases in their ability to dissolve liquids or solids, and have tunable properties, e.g., small changes in pressure or temperature can result in a large change in density. Supercritical water is a non-polar solvent having good organic solubility or poor salt solubility, much enhanced oxygen solubility, and a tunable density (e.g, between that of a vapor and liquid).

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate common and alternative examples of how the disclosure can be made and used and are not to be construed as limiting the disclosure to only the illustrated and described examples. Further features and advantages will become apparent from the following, more detailed, description of the various embodiments of the disclosure, as illustrated by the drawings referenced below.

DETAILED DESCRIPTION

Figure 1:
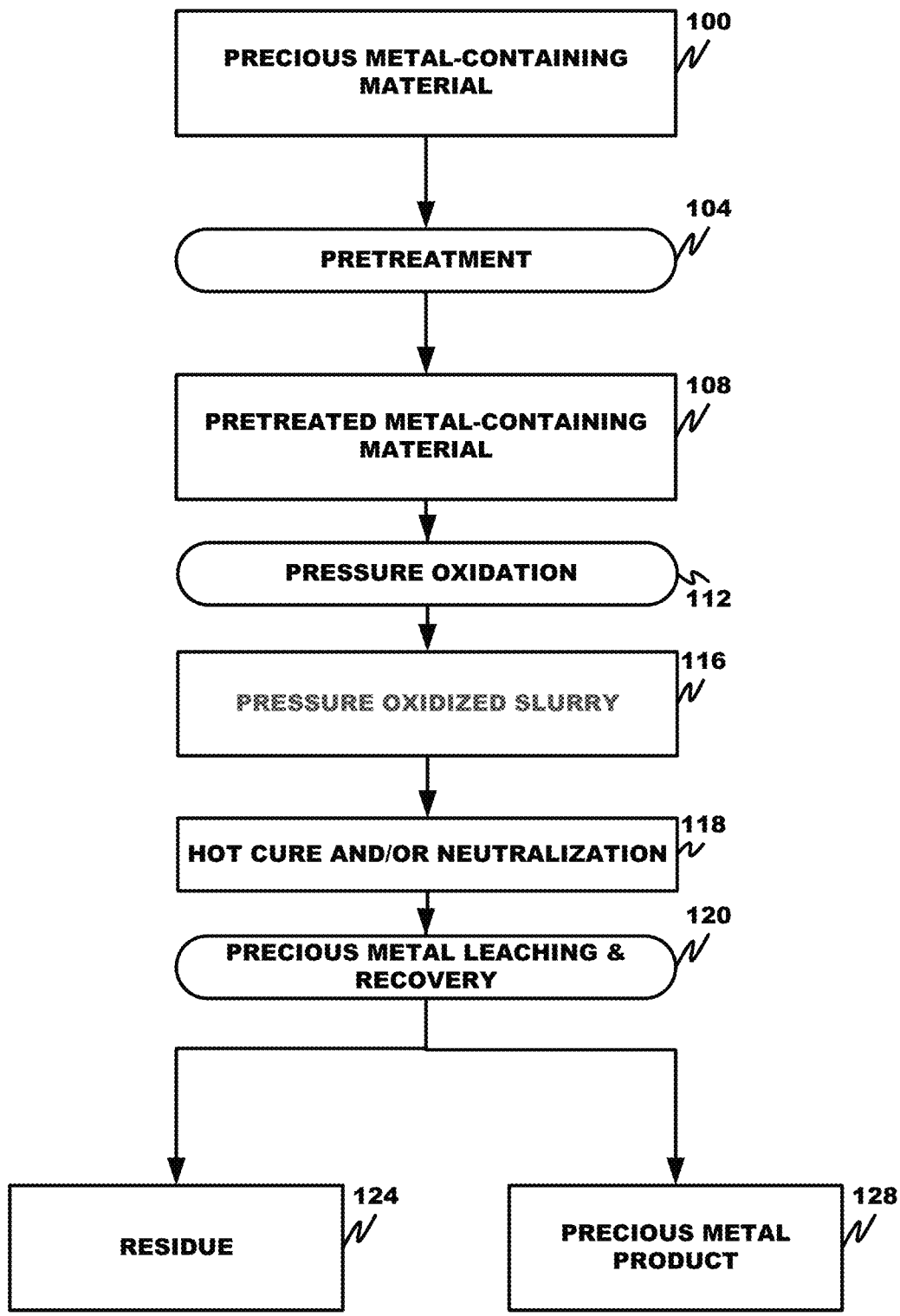
FIG. 1 is an embodiment of a process according to an embodiment of the present disclosure.

A first embodiment of the present disclosure will be discussed with reference to FIG. 1. The present disclosure is particularly useful for refractory or double refractory mineral material feeds in which less than about 60% of the gold is recoverable by direct cyanidation techniques, and even more particularly useful for ores in which less than 40% of the gold is recoverable by direct cyanidation.

The present disclosure conducts the high-temperature (HT) pressure oxidation operation to reduce the susceptibility of gold to be captured and held by CM during pressure oxidation, thereby rendering the residue from pressure oxidation more susceptible to high gold recoveries during subsequent gold recovery processing (typically carbon-in-leach cyanidation). While not wishing to be bound by any theory, it is believed that the CM in the ore is a mixture of active and graphitic species. The more active CM species are the first to be oxidized. Consequently, the graphitic fraction becomes dominant as the extent of pressure oxidation nears completion. For a given refractory or double refractory gold ore, gold recovery after CM oxidation can be an order of magnitude higher than in the absence of CM oxidation. The average gold loading for all CM after carbon-in-leach is about 95 ppm in the absence of CM oxidation and on graphite may be as low as 3 ppm at 90% CM oxidation.

In a pretreatment step 104, a precious metal-containing material 100 is pretreated. The precious metal-containing material 100 can be in the form of an ore, concentrate, tailings, matte, slag, calcine, precipitate, or other material having precious metal-bearing mineral components. Typically, the precious metal-containing material 100 is a whole ore that is free of flotation or other type of mass pull that metallurgically removes as tailings a part of the ore being subjected to pressure oxidation. It is also typically free of roasting. In some applications, the material 100 is a blend of whole ore and copper concentrate with the concentrate addition yielding more than about 1 g/L soluble copper after the first stage pressure oxidation.

In the precious metal-containing material 100, the precious metal is typically present as a sulfide, such as acanthite, argentite, and argentopyrite for silver and argentiferous gold sulfide and uytenbogaardtite for gold, or as a finely sized inclusion in the mineral grains of other sulfides (e.g., marcasite, pyrite, pyrrhotite, and arsenopyrite). The material 100 commonly includes at least about 6 wt. % and even more commonly from about 0.75 to about 40 wt. % sulfide sulfur; at least about 0.1 oz/tonne and even more commonly from about 0.05 to about 50 oz/tonne gold; at least about 1.0 oz/tonne and even more commonly from about 0.05 to about 500 oz/tonne silver; at least about 50 wt. %, even more commonly from about 50 to about 95 wt. % silicates; at least about 0.1 wt. %, more commonly at least about 2.5 wt. %, more commonly at least about 5 wt. %, more commonly at least about 7.5 wt. %, more commonly at least about 10 wt. %, and even more commonly at least about 12.5 wt. % feldspar minerals. In some applications, the precious metal-containing material 100 comprises at least about 0.1 wt. %, more commonly at least about 0.25 wt. %, more commonly at least about 0.5 wt. %, more commonly at least about 1 wt. %, and even more commonly at least about 2.5 wt. % mica or muscovite. At low sulfide sulfur contents, sulfides can be added to the material 100 to enable semi-autogenous or fully autogenous pressure oxidation.

The precious metal-containing material 100 can further include inorganic carbon and CM. CM is frequently preg robbing and occurs as disseminated CM. The CM may be any CM having an affinity for at least one of gold, a gold salt or a gold complex. This affinity, however, may vary widely depending upon the type, origin, hydrophobicity, porosity and other properties of the CM. Generally, the amount of CM in a mineral material is determined as the total amount of carbon in the mineral material except that which is present in a carbonate group. Typically, the precious metal-containing material 100 includes at least about 0.3 wt. %, more commonly at least about 0.5 wt. % and even more commonly at least about 0.75 wt. %, and even more commonly at least about 5 wt. % CM but commonly no more than about 15 wt. %, more commonly no more than about 10 wt. %, even more commonly no more than about 5 wt. %, and even more commonly no more than about 2.5 wt. % CM. In some applications, the material 100 includes from about 0.1 to about 30 wt. % inorganic carbon-containing materials (primarily as carbonates) and from about 0.3 to about 10 wt. % carbonaceous (potentially preg-robbing) materials. In some applications, the CM comprises at least about 0.1 wt. %, more commonly at least about 5 wt. % but no more than about 25 wt. % and more commonly no more than about 20 wt. % graphite and at least about 1 wt. %, more commonly at least about 10 wt. % but no more than about 95 wt. % and more commonly no more than about 90 wt. % CM.

While the grind size depends on the gold-containing mineral(s) in the precious metal-containing material 100, the material commonly has a $P_{80}$ size of no more than about 100 microns, more commonly of no more than about 75 microns, and even more commonly of no more than about 50 microns. Valuable metals are commonly liberated from host materials in these size ranges.

In the pretreatment step 104, the precious metal-containing material 100 is slurried with water and/or contacted with acid (e.g. depending on carbonate content) and/or limestone, lime, or other caustic compound (depending on sulfide content) to prepare it for pressure oxidation. Pretreatment of carbonate containing precious metal-containing materials with acid (either new acid or recycled acidic liquors from elsewhere in the process) reduces the generation of and the need to vent $CO_2$ during autoclave operation, thereby improving the oxygen efficiency of the pressure oxidation process. The common pH of the pretreated metal-containing material ranges from about pH 0.5 to about pH 8.0, and the pulp density from about 15% to about 55% solids. If necessary, acid consumers can be added to adjust the pH of the pretreated metal-containing material 108 to the desired pH range.

The pretreated metal-containing material 108 is next subjected to pressure oxidation in step 112 to form a leached slurry 116 and destroy at least most of the preg robbing CM. While not wishing to be bound by any theory, it is believed that pressure oxidation performed at temperatures above 240° C. (which is the generally accepted maximum operating temperature for autoclave designs) can substantially destroy preg robbing CM and provide gold recoveries near the technical limit. Typically, pressure oxidation is performed at operating temperatures of more than 240° C., more typically at least about 250° C., more typically at least about 255° C., more typically at least about 260° C., more typically at least about 265° C., more typically at least about 270° C., and even more typically at least about 275° C.

When the precious metal-containing material 100 comprises feldspar minerals, such as mica or muscovite, the feldspar minerals dissolve at high pressure oxidation temperatures (e.g., above 250° C.) and at low pH to release aluminum into solution that causes the formation of refractory alunite. While not wishing to be bound by any theory, it is believed that the dissolution of silicate gangue mineral species present within the ore can negatively impact gold recoveries beginning at 250° C. if the pH of the POx discharge is not controlled within a tight range. Reductions of up to 40% in gold recovery have been observed under these operating conditions. To control dissolution of feldspar minerals and maintain a muscovite or mica dissolution of no more than about 1%, more typically of no more than about 0.75%, and more typically no more than about 0.5% or, stated differently, maintain at least most, more typically at least about 95%, more typically at least about 98.5%, more typically at least about 99%, and even more typically at least about 99.5% of the muscovite or mica in the solid phase during pressure oxidation, the pH of the slurried material 100 during high temperature pressure oxidation is typically maintained above about pH 1.5, more typically at or above about pH 1.6, more typically at or above about pH 1.7, more typically at or above about pH 1.8, more typically at or above about pH 1.9, and even more typically at or above about pH 2 and below a maximum pH of about pH 2 by adding a base, such as a hydroxide (e.g., lime) or carbonate (e.g., limestone). In some applications, the pH ranges from about pH 1.5 to about pH 1.7.

Due to the higher pH, however, multi-valent iron, particularly ferric iron, precipitates as hematite. The loss of dissolved ferric iron can slow the rate of CM oxidation and lengthen RT. To supplement dissolved multi-valent cation concentration and maintain a high rate of CM oxidation, other metal multi-valent cations, such as copper, nickel, manganese, and chromium, that are soluble in the pH range of pH 1.5 to pH 2.5 can be added to the material 100 before or during pressure oxidation. In particular, cupric ion (e.g., as copper sulfate, copper oxide, copper chloride, copper nitrate, and other copper salts) was found to catalyze the oxidation rate, and an 80% minimum CM oxidation target can be met at 270° C. within 60 minutes of RT. Sufficient copper is present (either natively in the material 100 or added during pretreatment 104 or both) to maintain a dissolved cupric ion concentration in the slurried material 100 during pressure oxidation of commonly at least about 0.25 g/L, more commonly at least about 0.5 g/L, more commonly at least about 1 g/L, more commonly at least about 5 g/L, and even more commonly at least about 10 g/L. Other multi-valent cations, such as nickel, manganese, and chromium, in equivalent concentrations after adjustment based on oxidation state and strength may also catalyze the oxidation reaction in a similar fashion. In some applications, a blend of copper flotation concentrate with a double refractory gold whole (or unfloated) ore can be synergistically processed by a dual-metal recovery POx flowsheet.

Molecular oxygen ($O_2$) is added during pressure oxidation, such as by sparging, to enable oxidation not only of CM but also sulfide and other minerals. Typically, the overpressure of molecular oxygen in the reactor is maintained at a level of at least about 25 psi, more typically at least about 50 psi, and even more typically at least about 100 psi but typically no more than about 150 psi, more typically no more than about 175 psi, and even more typically no more than about 200 psi.

Commonly, the RT in the reactor of the slurry is no more than about 60 minutes, even more commonly no more than about 40 minutes, and even more commonly no more than about 20 minutes. As pressure oxidation temperature is increased to the levels noted above, the RT can be maintained at relatively short intervals due to the progressively faster oxidation reaction kinetics occurring within the reactor.

In some applications, the sulfide sulfur and CM oxidation is performed using wet-air or thermal liquid-phase oxidation (WAO) process techniques in which the generation of active oxygen species, such as hydroxyl radicals, takes place at high temperatures (e.g., ranging from about 175 to about 350° C.) and pressures (e.g., ranging from about 20 to about 200 bar). RTs of the liquid-phase in a three-phase reactor typically ranges from about 10 to about 120 minutes and the extent of CM removal is typically from about 75 to about 95%. In a Catalytic WAO process (CWAO), the reaction kinetics can be increased, and the temperature and RT reduced, through the use of catalysts, including those described above. In WAO processes, the organic contaminants dissolved in water are either partially degraded by means of an oxidizing agent into biodegradable intermediates or mineralized into innocuous inorganic compounds such as $CO_2$, $H_2O$, and inorganic salts, which remain in the aqueous phase; sulfide sulfur is converted to sulphate; and halogens are converted to halides.

In the CM oxidation processes above, a broad array of homogenous and heterogenous catalysts can be employed. Such catalysts typically have the following characteristics: (a) fast oxidation speed; (b) non-selective, can achieve complete oxidation; (c) stable physical and chemical properties in hot acidic solution; (d) high activity at temperature, long service life, insensitive to toxicants, and (e) high mechanical strength and wear resistance. Exemplary homogenous catalysts include (dissolved) metal salts, such as multi-valent transition metal and rare earth salts (e.g., nickel, manganese, Ce, La, and chromium salts), and heterogenous catalysts include supported and unsupported metals, oxides, and composite oxides). Mixtures of homogenous catalysts, such as mixtures of copper, zinc, cobalt, manganese, and bismuth, and heterogenous catalysts can be used. In some cases, one or more solid phase heterogenous catalysts, such as vanadium oxides, supported transition metals (e.g., iron oxides on alumina, $TiCl_3$ on $MgCl_2$, and Mo—Co on alumina), supported rare earth metals, and one or more noble or precious or platinum group metals (e.g., gold, silver, or platinum) alone or deposited on a support such as titania or titania-zirconia oxides, Pt—Rh, nickel or $K_2O$, and silver on alumina are employed. In particular, a synergistic effect of certain composite oxides can increase the activity of the catalyst and inhibit the dissolution of active components. The combination of CoO, CuO, or NiO with the oxides of Fe(III), Pt, or Ru can be effective catalyst. As will be appreciated, heterogenous catalysis is catalysis where the phase of catalysts differs from that of the reactants or products. In contrast, homogeneous catalysis is catalysis where the reactants, products and catalyst exist in the same phase. "Phase" distinguishes among not only solid, liquid, and gas components but also immiscible mixtures (e.g., oil and water), or anywhere an interface is present. Combinations of homogenous and heterogenous catalysts can be employed. For either homogenous or heterogenous catalysts, oxides of Al, Hf, Zr, Ce, and Ti are known to be stable and can be used as catalyst supports. To reduce leaching of the catalyst, the catalytically active compounds should be incorporated into a lattice of catalyst support.

The consumption of homogeneous or heterogeneous catalysts is believed to be relatively low as the catalyst is not believed to be consumed during CM oxidation.

While not wishing to be bound by any theory, it is believed that the amount and distribution of CM multivalent metal cations, such as iron, vanadium, and boron, that are impurities within the CM (or graphite) matrix can increase the CM oxidation rate. Higher oxidation temperatures can further increase the rate of oxidation due to a change to a thermally dominant oxidation mechanism for the CM.

A challenge to optimizing the efficacy of the catalyst in oxidizing CM is adding the catalyst to the CM. The catalyst can be immobile during the oxidation process and, for optimal oxidation performance, should be internal to or on the CM matrix. One method to cause such intimate contact is to contact the catalyst in liquid form with the precious metal-containing material 100 or pretreated metal-containing material 108. This could be done during a wet comminution stage (e.g., wet crushing or grinding) or after the first stage of sulfide sulfur oxidation and before the second stage of CM oxidation. Adding the catalyst in the gas phase during sulfide sulfur or CM oxidation would be difficult to accomplish and require potentially expensive and complex off-gas treatment.

In one application, a homogenous copper sulfate catalyst produced from the addition of a copper concentrate, such as a copper sulfate-containing solution derived from copper leaching (e.g., a pregnant leach solution) or solvent extraction (e.g. electrolyte) or barren solution (e.g., a raffinate) is employed. The concentration of copper in the concentrate or barren solution typically ranges from about 0.25 to about 50 g/L and more typically from about 1 to about 40 g/L. Raffinate will typically contain from about 1 to about 10 g/L copper. The concentrate or barren solution can be added at any point upstream of CM oxidation, particularly during pretreatment step 104.

In one application, pressure oxidation conducted under supercritical operating conditions, such as those set forth above for CM oxidation, is used for alkaline ore types. Catalyst addition may not be required at such high temperatures, potentially due to a different thermally-driven mechanism for CM oxidation.

Figure 2A:
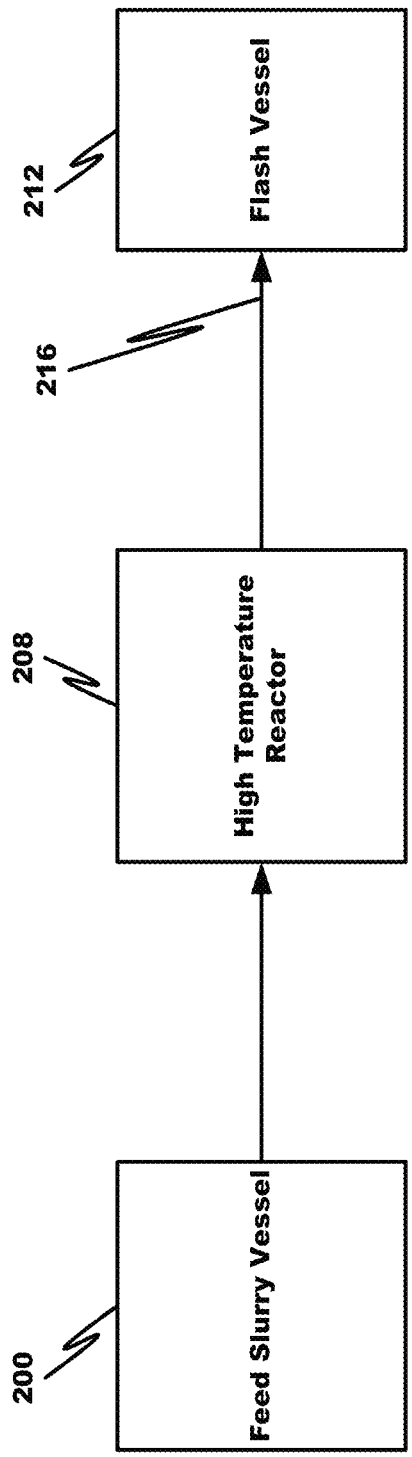
FIG. 2A is an embodiment of a pressure oxidation circuit according to an embodiment of the present disclosure.

FIG. 2A depicts pressure oxidation in greater detail. FIG. 2A depicts a high temperature pressure oxidation process in which the precious metal-containing material 100 in feed slurry vessel 200 is pressure oxidized in a high temperature reactor 208 operating under high temperature and super-atmospheric operating conditions as described above to oxidize both sulfide sulfur and preg-robbing CM. Reactants, such as additional sulfide sulfur, base, acid, and/or copper-containing material, can be added to the input before introduction into the high temperature reactor 208. Molecular oxygen is introduced as a gas to the high temperature reactor to enable pressure oxidation to occur, and off gases are collected for treatment and eventual release.

Any high temperature reactor can be employed in pressure oxidation. Examples include a modified autoclave such as used in a high-pressure acid leach to recover nickel and cobalt from laterite ores. The high temperature reactor 208 can be a continuously stirred-tank reactor, a plug flow reactor that is either unstirred or comprises only static mixers, and the like. Static mixers are an arrangement of mixing elements installed in the reactor. They function without moving parts and are used to achieve specific mixing and dispersion in the continuous pressure oxidation process. The mixing process is not random; it follows precise patterns and is therefore predictable.

In the high temperature reactor, not only subcritical but also supercritical water conditions may be employed to realize substantially optimum pressure oxidation performance. Supercritical oxygenated water conditions have been determined to provide rapid oxidation of CM materials. Oxygenated water not only at subcritical water temperatures (about 270-300° C.) but also at supercritical water conditions (about 650° C.) can simultaneously oxidize both arsenian pyrite and carbonaceous matter to a high degree (e.g., more than about 50 mole % and, depending on the reactor design, at least about 75 mole % of each can be oxidized). The extreme operating conditions of supercritical water may eliminate the need for multi-valent cation catalyzation. Under such conditions, copper and iron commonly can convert to oxides; pyritic minerals can yield elemental sulfur and/or sulfate sulfur rather than sulfuric acid as a major product; many organic compounds, such as CM and other hydrocarbons, can become soluble or be oxidized to $CO_2$ and water; and many ionized species, such as cations, can become less soluble. The RT for such substantially complete CM oxidation is typically no more than about 15 minutes, more typically no more than about 10 minutes, more typically no more than about 5 minutes, and even more typically no more than about 2.5 minutes. In some applications, the RT of substantially complete CM oxidation is less than one minute and can even be within 15 seconds at supercritical water conditions.

Figure 2B:
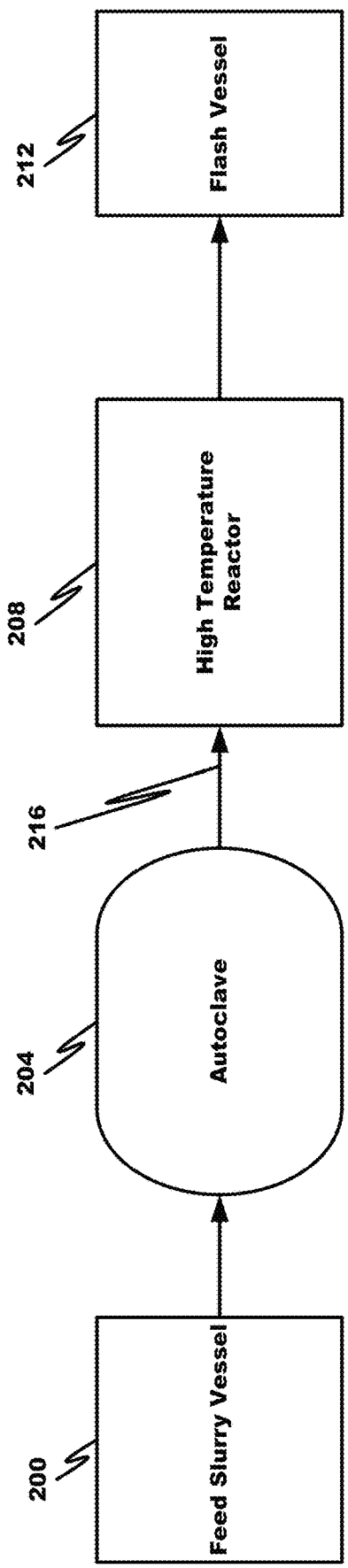
FIG. 2B is an embodiment of a pressure oxidation circuit according to an embodiment of the present disclosure.

FIG. 2B depicts a two-stage pressure oxidation process in which the precious metal-containing material 100 in feed slurry vessel 200 is first pressure oxidized in an autoclave 204 under conventional operating conditions (e.g., at super-atmospheric pressure, an operating temperature less than 240° C., a pH in the range of pH 0.5 to pH 8, and a molecular oxygen overpressure in the range of about 50 psi to 250 psi) to oxidize most of the sulfide sulfur in the precious metal-containing material 100 followed by a second stage of pressure oxidation in a high temperature reactor 208 under high temperature and super-atmospheric operating conditions as described above to oxidize most of the preg-robbing carbonaceous material in the precious metal-containing material 100. Reactants, such as additional sulfide sulfur, base, acid, and/or copper-containing material can be added to the autoclave output 216 before introduction into the high temperature reactor 208. Molecular oxygen is introduced as a gas to the autoclave and high temperature reactor to enable pressure oxidation to occur, and off gases are collected for treatment and eventual release. The use of lower and higher temperature zones in a common or separate reactor is known in the recovery of nickel and/or cobalt from sulfidic ores and concentrates.

While the autoclave 204 is a continuously stirred-tank reactor, the high temperature reactor, as noted previously, is typically a plug flow reactor that is either unstirred or comprises only static mixers. While the material 100 moves along a substantially horizontal path of flow through the autoclave 204, the material 100 can move along a horizontal or vertical flow path through the high temperature reactor depending on the orientation of the reactor 208.

The RT in the autoclave reactor under conventional operating conditions is typically sufficient to oxidize at least about 25%, more typically at least about 50%, and even more typically at least about 85% of the sulfide sulfur but typically no more than about 25 mole %, more typically no more than about 15 mole %, more typically no more than about 10 mole % and even more typically no more than about 5 mole % of the CM. The residence time in the high temperature reactor by contrast is typically sufficient to oxidize at least about 50%, more typically at least about 75 mole %, and even more typically at least about 85 mole % of the sulfide sulfur remaining in the autoclave output 216 and typically at least about 50 mole %, more typically at least about 65 mole %, more typically at least about 70 mole % and even more typically at least about 75 mole % of the CM.

The two-stage oxidation process of FIG. 2B in which the arsenian pyrite is oxidized in the initial step at 225° C. and the CM is oxidized in the final step at a higher temperature can yield a similar percentage CM oxidation when compared to the single stage oxidation process of FIG. 2A, but with the RT at the higher temperature reduced by 50% or more.

In another two-stage oxidation process configuration, a single or multi-stage roaster or first and second stage roasters is/are employed rather than pressure oxidation techniques. As will be appreciated, roasting can be carried out in one or multiple stages depending on the ore type. Single-stage roasting comprises dead roasting in an oxidizing atmosphere. The major objectives of the roasting process include eliminating the sulfur and carbon contained in the concentrate, removing impurities such as arsenic, and providing a calcine product and $SO_2$-containing gas. A roasting temperature of 400-800° C. and roasting atmosphere of from about 10 to about 100% oxygen (by volume) is generally suitable depending on the process and the mineralogical requirements. The products of the roasting process are calcine and roasting gas. The calcine consists of $Fe_2O_3$, $Fe_3O_4$, $FeSO_4$, and gangue material, while the roasting gas contains $SO_2$, $SO_3$, $O_2$, $N_2$, and $H_2O$ as steam. Depending on the chloride content in the roaster feed, HCl may also exist in the roasting gas. The off-gas impurities are removed from the process together with the effluent stream in a wet gas cleaning section.

For feed materials comprising high arsenic concentration (e.g., occurring as arsenopyrite (FeAsS)), material treatment may require two-stage roasting in which the first stage is operated under reducing conditions to remove impurities such as arsenic and antimony while the second stage uses an oxidizing atmosphere as set forth above to complete the oxidation process. Under normal roasting conditions, a slight excess of oxygen in relation to the stoichiometric requirement for converting the iron content of the pyrite to hematite is employed. The majority of the arsenic is oxidized to As(V) and reacts with the hematite to form stable iron arsenate ($FeAsO_4$). In this way, about 70-80% of the arsenic content in the feed becomes bound to the waste material. The remaining arsenic, which is oxidized to As(III), is volatilized and entrained by the roaster gas and must be separated in the wet gas cleaning system.

A further stage of roasting can be added to either the single- or multi-stage roasting processes to oxidize CM. The roasting conditions are the same as those set forth above for CM oxidation. Catalyzation can be important to decrease the roasting temperature of this stage as much as possible (e.g., in the range of from about 400 to about 800° C.). As will be appreciated, higher roasting temperatures (e.g., above about 650° C.) can cause iron oxides, that contain much of the precious metal content, to be refractory or impervious to cyanidation.

The pressure oxidation discharge solutions can contain low arsenic concentrations of typically no more than about 500 mg/L more typically no more than about 350 mg/L, and in some cases with an average of approximately 100 mg/L with the majority of arsenic reporting to the solids, with the average value being over about 2,000 g/t. Exceptions to this were the high copper addition tests. When copper additions were at or above about 5 g/L $Cu^{2+}$, pressure oxidation discharge solutions surged above about 1,000 mg/L As and the resulting CIL residues were below about 1.400 g/t As. It is likely that adding excess sulfate to the system caused other ions to complex rather than arsenic, thus keeping arsenic in solution and preventing precipitation as an iron-arsenic compound.

From a chemical efficiency standpoint, molecular oxygen is used in the first stage while hydrogen peroxide and/or persulfate is used in the second stage. Hydrogen peroxide and/or persulfate may be best used after pressure letdown from the first stage. These Advanced Oxidation Process (AOP) reagents would be used in a second stage treatment for oxidation of CM and take place in a set of CSTR's in series at lower temperature 60-80° C. Hydrogen peroxide thermolysis (decomposition) is commonly nearly 100% complete at 225° C. within about 15 seconds. Part of the $H_2O_2$ thermolysis produces molecular oxygen.

In one application, the carbonaceous material oxidation catalyst is present during pressure oxidation in autoclave 204 to facilitate carbonaceous material oxidation during the first stage pressure oxidation step 112 and thereby reduce the RT during the second stage higher temperature oxidation stage in high temperature reactor 208.

In some applications, low temperature oxidation to oxidize most of the CM can be performed ahead of pressure oxidation in autoclave 204 to oxidize most of the sulfide sulfur.

In either process configuration, the high temperature reactor slurry output 216 is flashed in one or more flash vessels, or pressure let down stages, to gradually let down pressure and temperature to atmospheric pressure and approximately 90° C. The steam released by the instantaneous reduction in pressure through the flash vessel is ducted to the corresponding splash vessel. Slurry leaving the pressure let down circuit can be cooled to ambient temperature by a series of heat exchangers.

Referring again to FIG. 1, the pressure oxidation step 112 is performed according to one or more of the above configurations to produce a pressure oxidized slurry 116. The oxidized slurry 116 includes solid residue, which is the solid residue from the pressure oxidation, mixed with an aqueous liquid. The aqueous liquid commonly has a pH of at least about pH 1.5, and a free sulfuric acid content in an amount of no more than about 28 g/L of the aqueous effluent liquid. The solid residue of the oxidized slurry 116 comprises substantially all of the gold from the material 100. In the oxidized slurry 116, at least most of the sulfur is present as sulfate sulfur while in the material 100 at least most of the sulfur is present as sulfide sulfur. At least most of the precious metals, particularly gold, remain in the oxidized residue.

After the first or second stage of pressure oxidation, the pressure oxidized slurry 116 can be subjected to a hot cure as discussed in U.S. Pat. No. 7,604,783 (which is incorporated herein by this reference) to convert basic ferric sulfate into hematite-followed by neutralization to prepare the residue for precious metal recover. By way of illustration, gold is commonly recovered by separating the gold-containing residue from the gold-lean liquid phase of the pressure oxidized slurry. The separated gold rich residue is neutralized using suitable acid consumers.

In step 120, the precious metal is recovered from the neutralized residue using known techniques to produce a gold barren waste residue 124 and a precious metal product 128. For example, the neutralized residue can be subjected to cyanidation to dissolve the gold into a pregnant leach solution. The dissolved gold is then concentrated by adsorption onto activated carbon (either in adsorption columns, in carbon added to the leaching process (known as Carbon-In-Leach (CIL) or Carbon-In-Pulp (CIP) techniques), or in resin added to the leaching process (known as Resin-In-Leach (RIL) technique). Greater than about 75%, more commonly greater than about 80% and more commonly greater than about 85% of gold in the residue is removable from the residue by CIL or CIP cyanidation. The high gold recoveries are attainable because only a small percentage, typically less than about 25% or less, more typically about 20% or less, more typically about 15% or less, and even more typically about 12.5% or less of the gold in the solid effluent is held or rendered insoluble by the CM.

Silver can be recovered using the process described in U.S. Pat. No. 8,252,254, which is incorporated herein by this reference. Surprising increases in silver recovery can also result from the high temperature pressure oxidation process. In pressure oxidation, refractory silver-containing iron-hydroxysulphate or jarosites can form from solubilized iron species and cause substantial reductions in silver recovery. Although jarosites increase during high-temperature pressure oxidation, jarosites have been found to lock up much less silver once treatment is performed at or above 300° C. It is believed that dissolved copper ion may also mitigate the lock up of silver. Regardless of the cause, high temperature pressure oxidation has been found to cause substantial increases in silver recovery compared to pressure oxidation processes operating at 240° C. or lower temperatures.

The adsorbed gold is eluted from the sorbent by stripping with ammonia, nitric acid, caustic, steam and/or other stripping solutions. The gold is then isolated and converted to a solid from the eluate by electrowinning (electroplating of gold onto cathodes), precipitation and filtration, or cementation.

Both single and dual-stage treatments having compatibility with both traditional continuously stirred reactor (CSTR) autoclave designs using plug flow reactor designs for carbon oxidation. The dual-stage treatment can reduce the stage 2 residence time needed for high-temperature oxidation of carbonaceous material by half when compared to single stage treatment. This favorable impact is believed to be related to having soluble multivalent cation catalysts, particularly a high concentration of soluble iron, present at time zero of the second stage. (Taking care of sulfide sulfur oxidation in the first stage is also a contributing factor. Carbonaceous material oxidation has less competition.)

Figure 3:
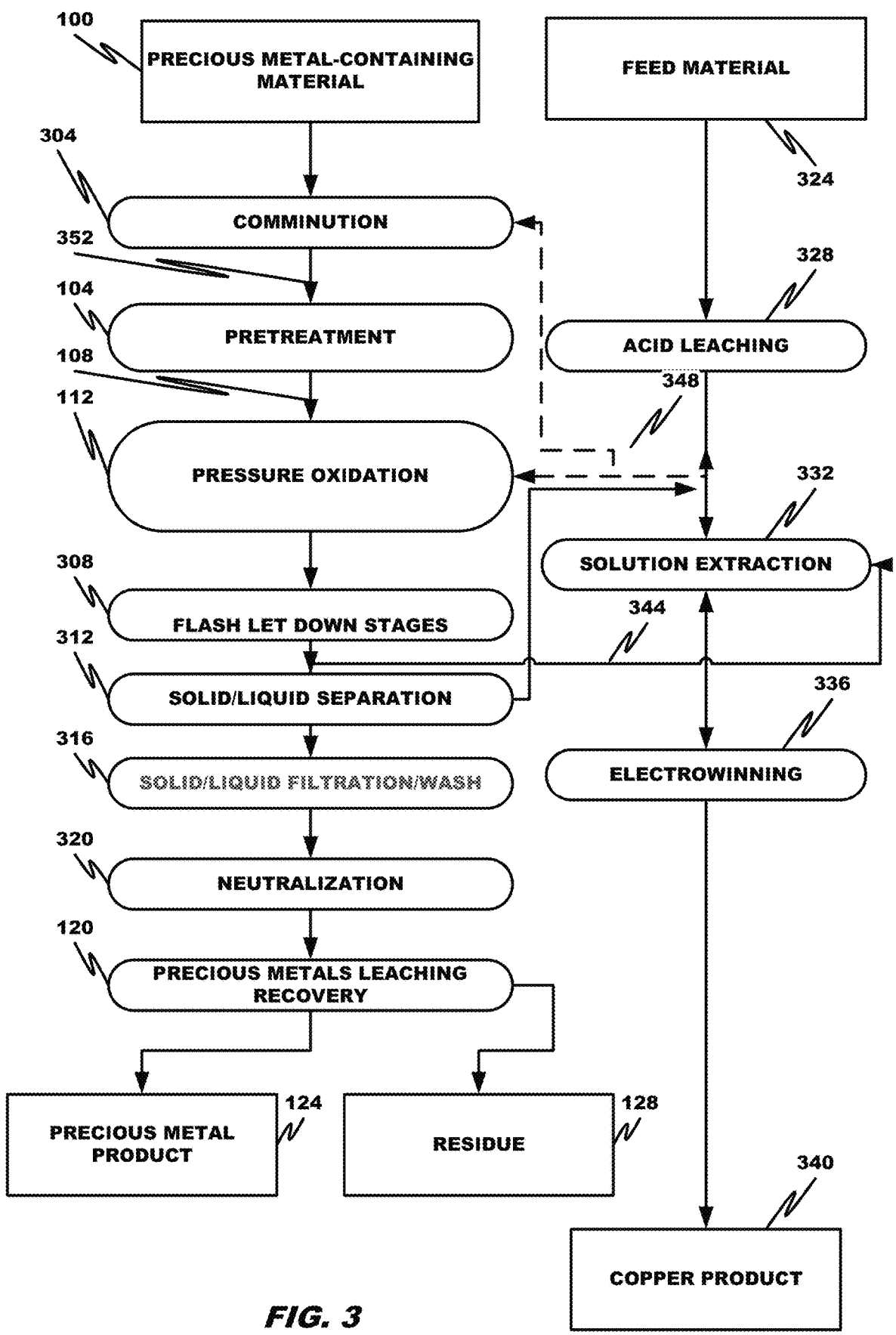
FIG. 3 is an embodiment of a pressure oxidation circuit according to an embodiment of the present disclosure.

With reference to FIG. 3, another embodiment of a precious metal recovery process is depicted.

The precious metal-containing material 100 is typically either a blend of refractory precious metal whole ore or flotation concentrate on the one hand with a copper flotation concentrate on the other.

The precious metal and copper-containing material 100 is subjected to comminution 304 to produce a comminuted feed material 352, and the comminuted feed material subjected to pretreatment 104 to produce the pretreated metal-containing material 108, which is fed to pressure oxidation 112 and the slurry output subjected to the flash let down stages 308 described above in connection with flash vessel 212.

The slurry output is then subjected to solid/liquid separation 312 to remove the pregnant copper leach solution from the precious metal-containing residue.

The residue is subjected to an optional solid/liquid filtration/wash 316 to remove residual acid from the residue, which is then subjected to neutralization 320 using a suitable acid consumers, such as lime, calcite, and/or dolomite.

The acid neutralized residue is subjected to precious metal recovery 120 to produce a precious metal product 124 and precious metal barren residue 128.

A copper dump leach can be part of an overall flowsheet but is not required by the embodiment. The feed material 324 is a low-grade copper-containing material.

The feed material 324 is subjected to leaching 328, using a suitable acid such as hydrosulfuric sulfuric acid. The leach can be a heap, stockpile, or tank leach depending on the application and can employ bioleaching or biooxidation using microbes such as *ferrooxidans*.

The pregnant leach solution from pressure oxidation 112, solid/liquid separation 312, and acid leaching 328 can be subjected to solution extraction to extract copper ion on an organic extractant, such as modified aldoximes, ketoximes, and modified aldoxime-ketoxime mixtures to produce a copper loaded organic extractant and a barren sulfuric acid solution that can be recycled to pretreatment 104. The copper can then be eluted or stripped using the recycled high sulfuric acid-containing electrolyte from electrowinning 336. The eluted copper is then subjected to electrowinning 336 to produce a copper product 340 and a barren electrolyte for recycle to solution extraction 332.

Figure 12:
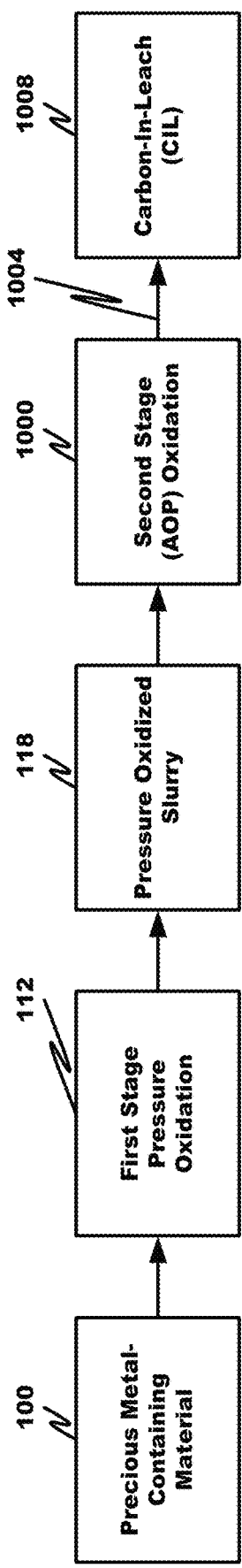
FIG. 12 is an embodiment of a process according to an embodiment of the present disclosure.

FIG. 12 depicts a process according to another embodiment. In the process, the precious metal-containing material 100 is subjected to first pressure oxidation stage 112 at a temperature of about 240° C. or less (typically about 225° C.) and the pressure oxidized slurry 116 subjected to lower temperature oxidation stage 1000, typically at an operating temperature typically ranging from about 50 to about 100° C., and more typically ranging from about 60 to about 80° C., and at atmospheric or superatmospheric pressure to oxidize most of the carbonaceous material using aqueous phase oxidation (AOP) methods. The oxidized residue can be neutralized to a pH above about pH 7 and subjected to carbon-in-leach (CIL) recovery techniques to recover dissolved precious metals. In second oxidation stage 1000, strong AOP oxidants, such as hydrogen peroxide, permanganate, persulfate, and other peroxides, are added to the slurry 116. Calculations indicate that the AOP oxidant is either decomposed due to thermolysis and/or consumed by oxidation processes within 1 minute or less (with less than 30 seconds being typical) after its addition in or immediately after the first pressure oxidation stage 112. When hydrogen peroxide is used as the AOP oxidant, some of the hydrogen peroxide produced molecular oxygen under these conditions rather than the target hydroxyl radical needed for rapid oxidant of carbonaceous matter. When using AOP oxidants, the second-oxidation stage 1000 flowsheet may utilize a set of continuous stirred reactors after the first pressure oxidation stage 112 and before CIL 1008. This process configuration would mimic a short post-pressure oxidation hot cure in gold processing flowsheets. An economic trade-off study would need to investigate whether AOP treatment is advantageous on a case-by-case basis.

While not wishing to be bound by any theory and as noted above, it has been discovered that the RT of pressure oxidation 112 to yield a target level of CM oxidation (which is typically at least about 80% or higher) can be significantly reduced by providing relatively high concentrations of a multi-valent metal catalyst and dissolved oxidant in the pretreated metal-containing material 108. To provide cupric ion in the pretreated metal-containing material 108 for catalyzing pressure oxidation 112, a bleed stream 344 of the copper-rich eluant can be combined with the recycled acid stream 348 and introduced as shown into pressure oxidation 112 and/or pretreatment 104 and/or comminution 304. To provide a suitable oxidant in the pretreated metal-containing material 108 for pressure oxidation 112, a suitable oxidant can be added to the pretreated metal-containing material 108, such as during pretreatment 104 and/or comminution 304. While any oxidant can be employed (such as molecular oxygen, ozone, hydrogen peroxide (which releases hydroxyl radicals), a halogen, hypochlorite, hexavalent chromium compounds, permanganate compounds, persulfate compounds (e.g., which release sulfate radicals), sodium perborate, nitrous oxide, potassium nitrate, sodium bismuthate, cerium (IV) compounds, mineral acid, lead dioxide, and sodium dichromate and mixtures thereof), typical oxidants used in the process include molecular oxygen (which is sparged into the pretreated metal-containing material 108 or other upstream solution) and/or hydrogen peroxide (which is added as a liquid to the pretreated metal-containing material 108 or other upstream solution and can beneficially provide free radicals in addition to dissolved molecular oxygen). Sufficient oxidant is added generally to produce a concentration in solution of more than 8 ppm, more generally of at least about 10 ppm, more generally of at least about 12.5 ppm, and even more generally of at least about 15 ppm dissolved molecular oxygen.

While not wishing to be bound by any theory, it has been further discovered that gold recovery in the processes of FIGS. 1-3 is relatively agnostic to halogen (e.g., chloride) levels in the pretreated metal-containing material 108. Accordingly, the build-up in solution of halogens in the pretreated metal-containing material 108 from recycled process streams arising from pressure oxidation of the material 100 (which natively contains halogens such as chloride, bromine, and iodine) can exceed more than 100 ppm, more typically more than about 125 ppm, more typically more than about 150 ppm, more typically more than about 200 ppm, and even more typically more than about 250 ppm total halogens with no adverse impact in gold recovery when compared to pressure oxidation processes under standard conditions in which total halogen (e.g., chloride) content in the pretreated metal-containing material 108 is maintained at or below 100 ppm.

While not wishing to be bound by any theory, it has further been discovered that gold recovery in the processes of FIGS. 1-3 is relatively agnostic to ammonia levels in the pretreated metal-containing material 108. The build-up of ammonia in solution from ammonium thiosulfate used in leaching gold from pressure oxidized residue has little, if any, adverse impact in gold recovery when compared to pressure oxidation operating under standard conditions.

EXPERIMENTAL

The following examples are provided to illustrate certain embodiments of the disclosure and are not to be construed as limitations on the disclosure, as set forth in the appended claims. All parts and percentages are by weight unless otherwise specified.

Applicant embarked on a study to determine if high temperature pressure oxidation would be effective for Nevada's Carlin type ores. Treatment of a double-refractory rougher concentrate by POx was briefly investigated with some modest success. However, due to the overall mineralogical challenges with flotation of Carlin-type ores, whole-ore treatment was selected as the common alternative. Recognizing that CAPEX and OPEX might become prohibitive under the more extreme operating conditions, the program's goal was to obtain favorable CM oxidation results at the lowest reactor temperature and/or shortest reactor RT possible.

Applicant's 2021 test program focused on POx pretreatment of Turquoise Ridge (TR) Stockpile O ore, a typical Carlin-type double refractory ore. The program has shown that oxygenated water at both subcritical water temperatures (270-300° C.) and supercritical water conditions (650° C.) has an ability to simultaneously oxidize both arsenian pyrite and carbonaceous matter to a high degree. The reactor RTs needed for achieving>80% oxidation of the CM have ranged between 15 seconds to 60 minutes depending on the operating temperature of the reactor. The gold recovery from the higher-temperature POx residues can approach the technical limit, which is set by the amount of gold encapsulated by silicates at the target grind size.

The program prioritized efforts toward the development of a robust technology that yields good to excellent CM oxidation performance either at a maximum temperature of 270° C. or a maximum of RT of 20 minutes. These threshold values were selected to be compatible with either the commercially proven autoclave reactor designs for nickel laterite ore treatment having up to 60 minutes of RT, or the practical limit for RT when considering the potential deployment of novel, higher-temperature reactors.

The study further explores the ability of oxygenated, water-based solutions to oxidize CM at both high subcritical and supercritical water temperatures and the possible use of oxidation catalysts to enhance CM oxidation kinetics over a range of subcritical water temperatures. The results of the study highlight that double refractory ores can be successfully pretreated by POx and that gold recovery from the residues using CIL can approach the technical limit set by the gold encapsulation in silicate minerals.

A 2-tonne bulk sample of TR Stockpile O material was collected for sample preparation. The sample was crushed to a $P_{100}$=2 mm, then blended and rotary split into 1 kg subsamples for the subsequent high-temperature pressure oxidation or POx program and other programs. The subsamples used for the bulk of the high-temperature POx program were ground to a $P_{80}$=20 microns to match the design P80 of the Sage Autoclave facility at TR.

Table 1 provides assays for the key elements and compounds, and Table 2 provides the primary minerals for TR Stockpile O. The study found that muscovite adds to the complexity of high-temperature POx pre-treatment.

TABLE 1

| TR Stockpile O Assays - Key Elements and Compounds | | | | | |
|---|---|---|---|---|---|
| [Au], ppm | [As], ppm | [Hg], ppm | $[S^{2-}]$, wt. % | $[CO_3^{2-}]$, wt. % | [CM], wt. % |
| 4.44 | 3188 | 66 | 2.4 | 3.2 | 1.1 |

TABLE 2

TR Stockpile O Mineralogy - Quantitative X-ray Diffraction

| Mineral | Wt. % |
| --- | --- |
| Quartz | ~72 |
| Muscovite | ~13 |
| Swelling Clay | ~5 |
| Dolomite | ~4 |
| Pyrite | 3.5 |
| Apatite | ~1 |
| Calcite | <1 |
| Orpiment | <1 |

Table 3 provides the gold deportment by major category. The gold is primarily associated with arsenian pyrite and CM. Only a few pure gold or electrum grains were visible microscopically within the subsample analyzed.

TABLE 3

TR Stockpile O Gold Deportment
(Tied to 4.4 ppm Au Head Assay)

| Gold Deportment Categories | [Au] Range (ppm) | Au Fraction |
| --- | --- | --- |
| Gold Associated with Sulfide Grains | 0-3500? | ~89 |
| CM Grains having Gold Colloids and/or Encapsulated Fine-Grained Pyrite | 0-900? | ~11 |

Preg robbing tests were performed and yielded preg robbing levels ranging from 83.5 to 84.2%.

Table 4 shows, compared to conventional lower temperature pressure oxidation processes, the reduced amount of silver rendered refractory by jarosite and therefore higher levels of silver recovery realized by the high temperature pressure oxidation process of the present disclosure:

| Name | type | Ag, ppm | Jarosite, wt % | Ag Recovery, % |
| --- | --- | --- | --- | --- |
| POX Feed Sample | Head | 4.15 | — | — |
| T43 270 1 H 5 g/L Cu | CIL Residue | 1.32 | 0.8 | 68.2 |
| T49 225 C. Baseline 20 um | CIL Residue | 1.60 | 0 | 61.4 |
| T41 270 C. 1 H | CIL Residue | 2.67 | 1.2 | 35.7 |
| T28 300 C. 60 min 20 um Repeat | CIL Residue | 0.33 | 1.1 | 92.0 |

All batch POX tests were performed on a Parr Instrument 2 L Hastelloy-C, floor standing bench top autoclave (BTAC) configured to continuously vent through a condensate tube.

The operation had success in the past with a $P_{80}$ particle size typically of less about 70 microns and more typically of no more than about 20 μm in the feed to the POX circuit. Therefore, this particle size became the basis for the remaining tests to maximize oxidation kinetics.

For samples that were acidulated, the solids were mixed with distilled water at 50 wt. % solids while adding concentrated sulfuric acid to the vessel contained in a water bath at 60° C. Acid was added according to the stoichiometric CO3 content and stirred in the reactor for 60 minutes. The solids were then filtered with the solution analyzed for metals by ICP and Cl, F by IC.

Distilled water was then heated to 80° C. to rinse the solids further to remove halides at a 2.3:1 water to solids ratio (or 30 wt. % solids). The slurry was mixed for 10 minutes followed by filtering. The solution was analyzed for metals by ICP and Cl by IC on preliminary samples to determine the wash efficiency.

Samples that underwent pH conditioning were treated with reagent grade sulfuric acid to a desired pH and mixed for 60 minutes at the planned POX pulp density. No samples were taken after pH conditioning prior to POX.

Both single and dual-stage POX testing were performed. The aim of single stage testing was to oxidize both sulfides and carbonaceous matter simultaneously. The goal of dual stage testing was to first oxidize sulfides under typical autoclave conditions (225° C. and 60 minutes), and then oxidize carbonaceous matter at higher temperatures during the second-stage treatment.

POX feed solids were combined with fresh distilled water to fill the vessel to an overall volume of approximately 1.2 L. POX feed pulp densities were 30% solids based on previous testing.

Initial weights were recorded prior to agitating the slurry and measuring the pH and ORP. After stable readings are measured, the bomb was sealed and heated to the temperature outlined in Table 6 below. At 95° C., the vent valve was briefly opened to vent any inert gases that are generated prior to reaching steam temperature. The partial pressure of these inert gases was noted and reported if deviations were present. Temperatures and oxygen overpressures were adjusted depending on the results.

For the dual-stage testing, oxygen addition ceased after completion of the 225° C. stage, and the bomb was vented to remove all oxygen. After all gases were removed, the temperature was then increased to 270/300° C. for the second stage treatment where oxygen addition commenced once again for a set retention time.

Hydrogen peroxide was also evaluated as an oxidant for the second stage treatment. Hydrogen peroxide (20 wt % peroxide solution) was injected into the bomb after the first stage once the oxygen and all gases were removed. No other inlets or outlets were open during this period. As peroxide was added, temperatures and pressures increased. After the addition of peroxide was complete, all inlets were closed, and the bomb was heated to 270/300° C. while the overpressures generated from peroxide addition were slowly bled out of the headspace.

Once the second stage temperature was reached, the oxygen vent gas purity was monitored, and oxygen was minimally added to provide additional oxidant.

All test conditions are outlined in Table 5 below. All 225 and 270° C. tests had an oxygen overpressure of 100 psig whereas 300° C. tests had an oxygen overpressure of 50 psig due to pressure limitations of the vessel. Venting rates were adjusted if vent oxygen purities were below 70%. If the venting rate increase did not cause the vent oxygen purity to increase after 10 minutes, the venting rate was brought back down to the original value.

TABLE 5

Standard POX Conditions

| Operating Conditions | Value | Units |
| --- | --- | --- |
| POX Temperature | 225/270/300 | ° C. |
| O2 Overpressure | 100/100/50 | psig |
| Agitation Speed | 700 | rpm |
| Venting Rate | 0.5 | L/min |
| POX Retention Time | 20-180 | min |

Agitated hot Carbon-In-Leach (CIL) leach tests were done on all POX residues using the conditions shown in Table 6. Activated carbon was pre-attritioned prior to pre-soaking in NaCN solution. pH and NaCN concentrations were monitored after 4 hours of leaching and adjusted to their target values as necessary. The pH was adjusted by adding hydrated lime as a 200 g/L Ca(OH)2 slurry. Cyanide additions were monitored stringently for the copper addition tests and increased to 10 lb/ton NaCN.

TABLE 6

Carbon-In-Leach Conditions

| Operating Conditions | Value | Units |
|---|---|---|
| Temperature | 60 | ° C. |
| Pulp Density | 35 | wt. % |
| Retention Time | 24 | hours |
| pH adjusted with Ca(OH)2 slurry | 10.5 | pH |
| Initial Cyanide Addition as NaCN | 5/10 | lbNaCN/tsolid |
| NaCN Maintained for the First 6 Hours | >0.5 | g/L |
| Activated Carbon Concentration | 24 | g/L |

After completion of POX, the oxidized slurry was weighed with the pH and ORP measured. A slurry sample was taken for POX discharge analysis. Slurries were filtered to collect the solution and wash the solids. Wash solutions were not assayed.

Higher alunite contents resulted in lower recoveries. The source of alunite was from muscovite dissolution driven by acidic, high-temperature POX solutions. Control of the POX discharge pH can be important to minimize dissolution. Values were monitored to identify the optimum ranges for maximizing organic carbon oxidation while minimizing the dissolution of muscovite. This was determined to be between the ranges of about pH 1.2-2.1, but even more optimally between about pH 1.5-1.7. Acidulation was discontinued after initial testing because the POX discharge pH was lower than the target range.

Figure 15:
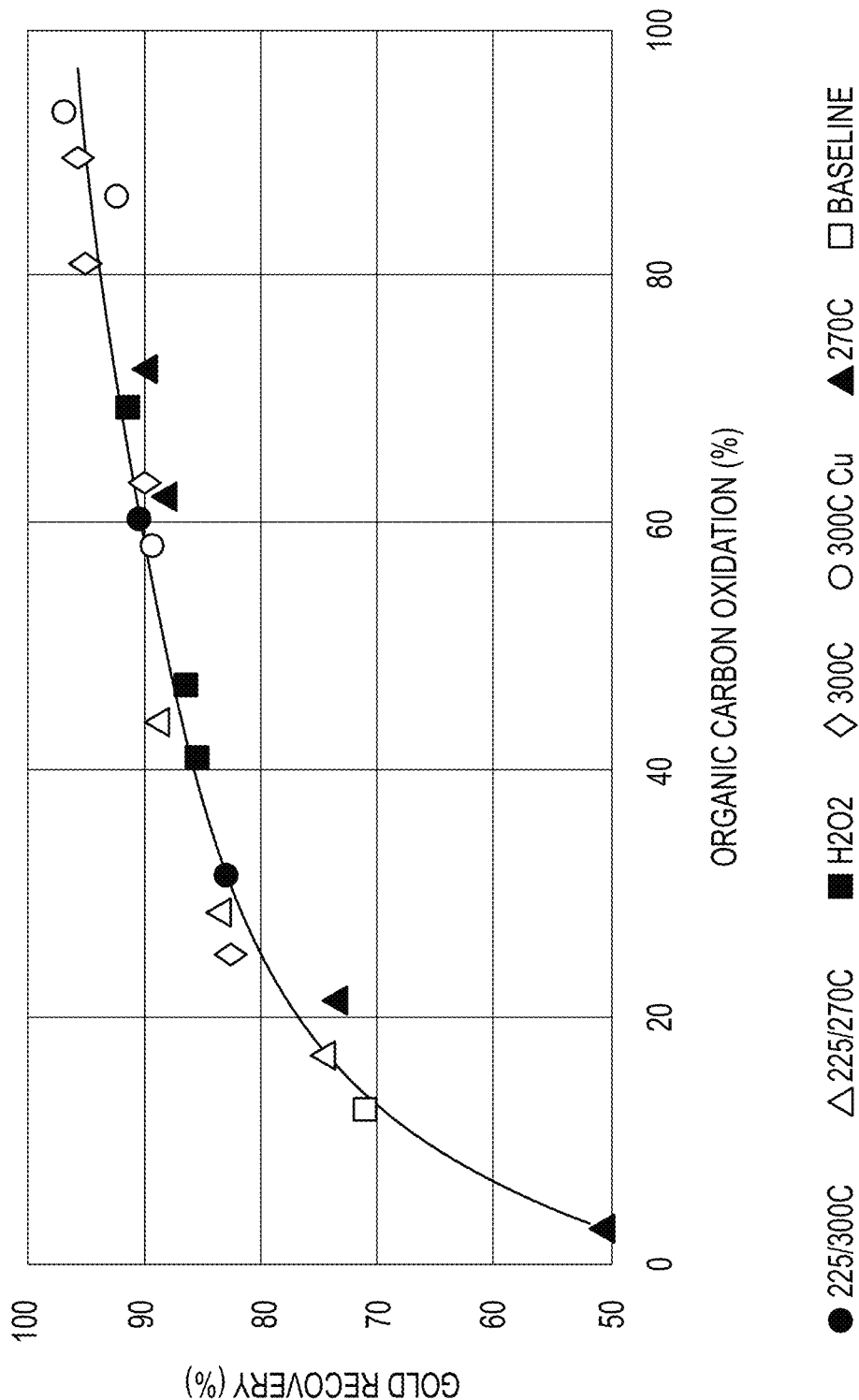
FIG. 15 is a plot of gold recovery (vertical axis) vs organic carbon oxidation (horizontal axis).

The optimum pH conditions at the fine grind resulted in achieving excellent oxidation of organic carbonaceous matter. Gold recoveries were approaching the technical limit, as seen in FIG. 15, when considering 3-4% of the gold is locked in very fine silicates.

Figure 4:
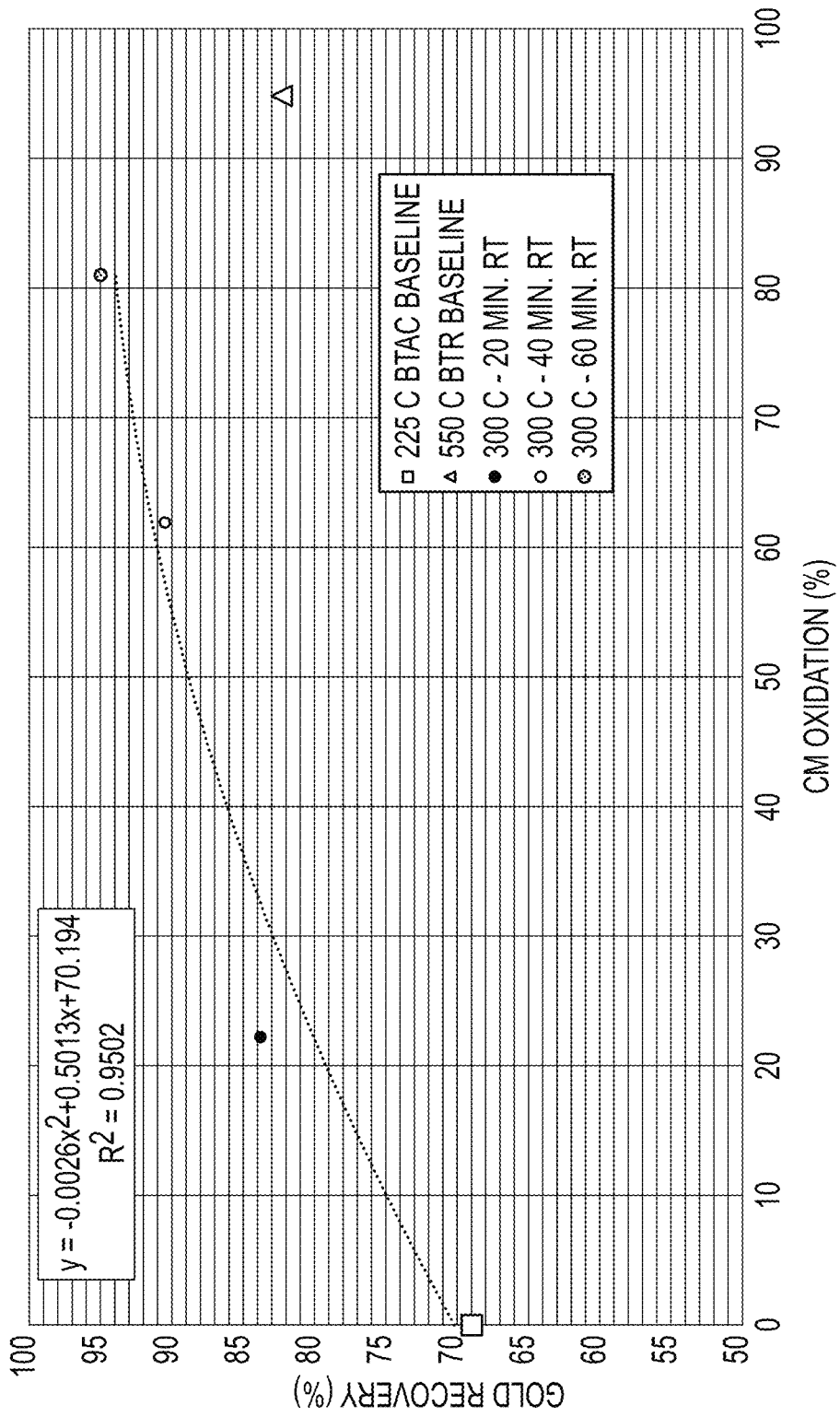
FIG. 4 is a plot of gold recovery (%) (vertical axis) against CM oxidation (%) (horizontal axis) during testing of selected double refractory whole ore having a $P_{80}$ of 20 microns at 300° C.) at 50 psi molecular oxygen partial pressure with no pH conditioning.

As expected, the oxidation kinetics for CM are enhanced at higher temperatures. As a result, the RT required to achieve the minimum oxidation target of >80% decreases. Specifically, the study has found that a temperature of 300° C. is required for robust performance when treating whole ore without additives. FIG. 4 illustrates that gold recovery by POx approaches the technical limit of 95% once CM oxidation exceeds 80%. The technical limit is set by the gold encapsulated by silicate minerals including quartz. The figure also shows that POx treatment yields a significantly higher gold recovery than roasting the ore at 550° C.

Ferric iron is known to oxidize organic carbonaceous matter that is contained within the ore. However, there was difficulty in maintaining ferric ion stability in solution at optimum pH and the redox couple for iron is kinetically slower in comparison to other catalysts. Copper was investigated, as the cupric/cuprous couple is more stable at higher pH than ferric/ferrous and is kinetically faster.

Figure 5A:
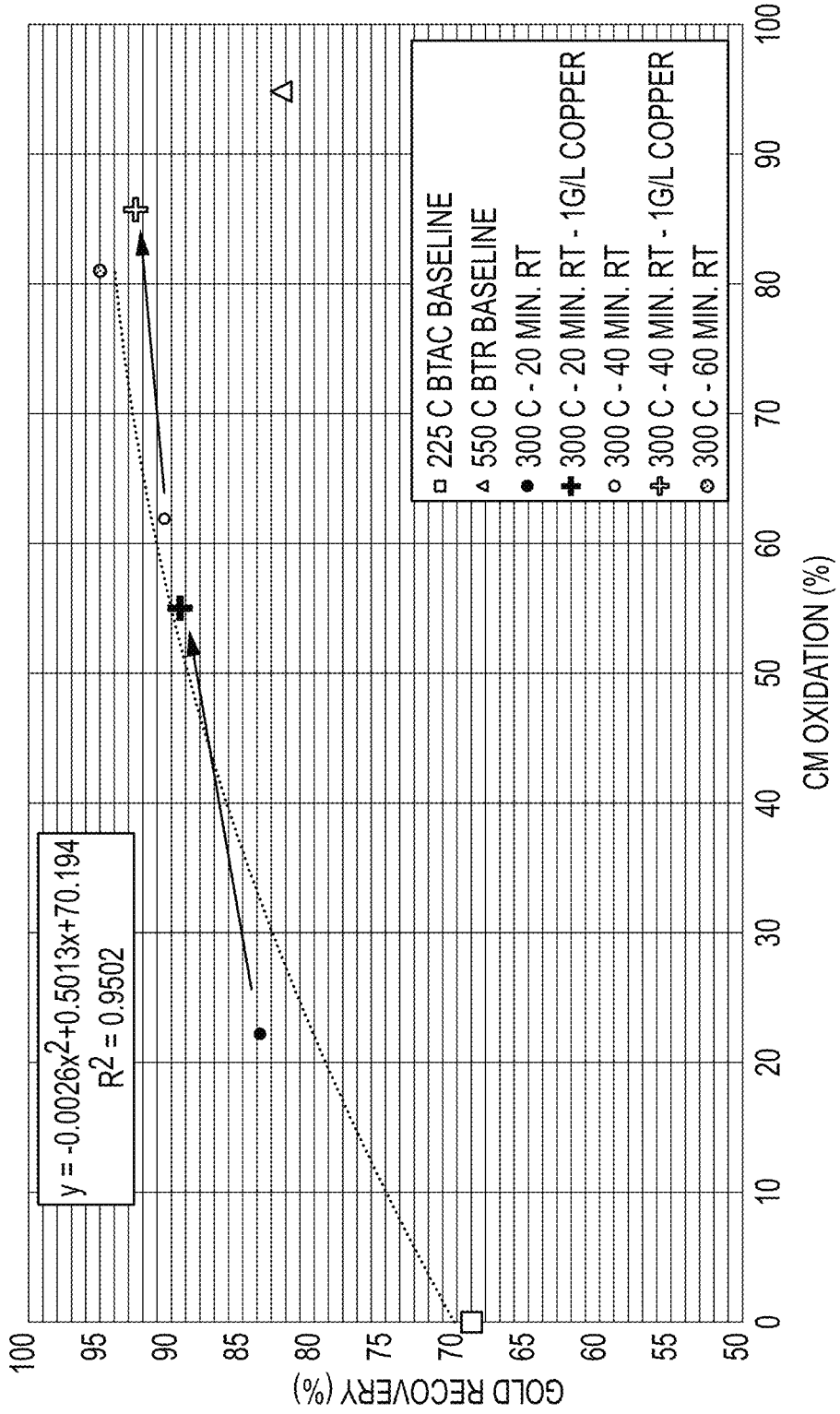
FIGS. 5A-B are plots of gold recovery (%) (vertical axis) against CM oxidation (%) (horizontal axis) during single stage pressure oxidation testing of selected double refractory whole ore at 270° C.) at 100 psi molecular oxygen partial pressure, an RT of 60 minutes, and with no pH conditioning.
Figure 5B:
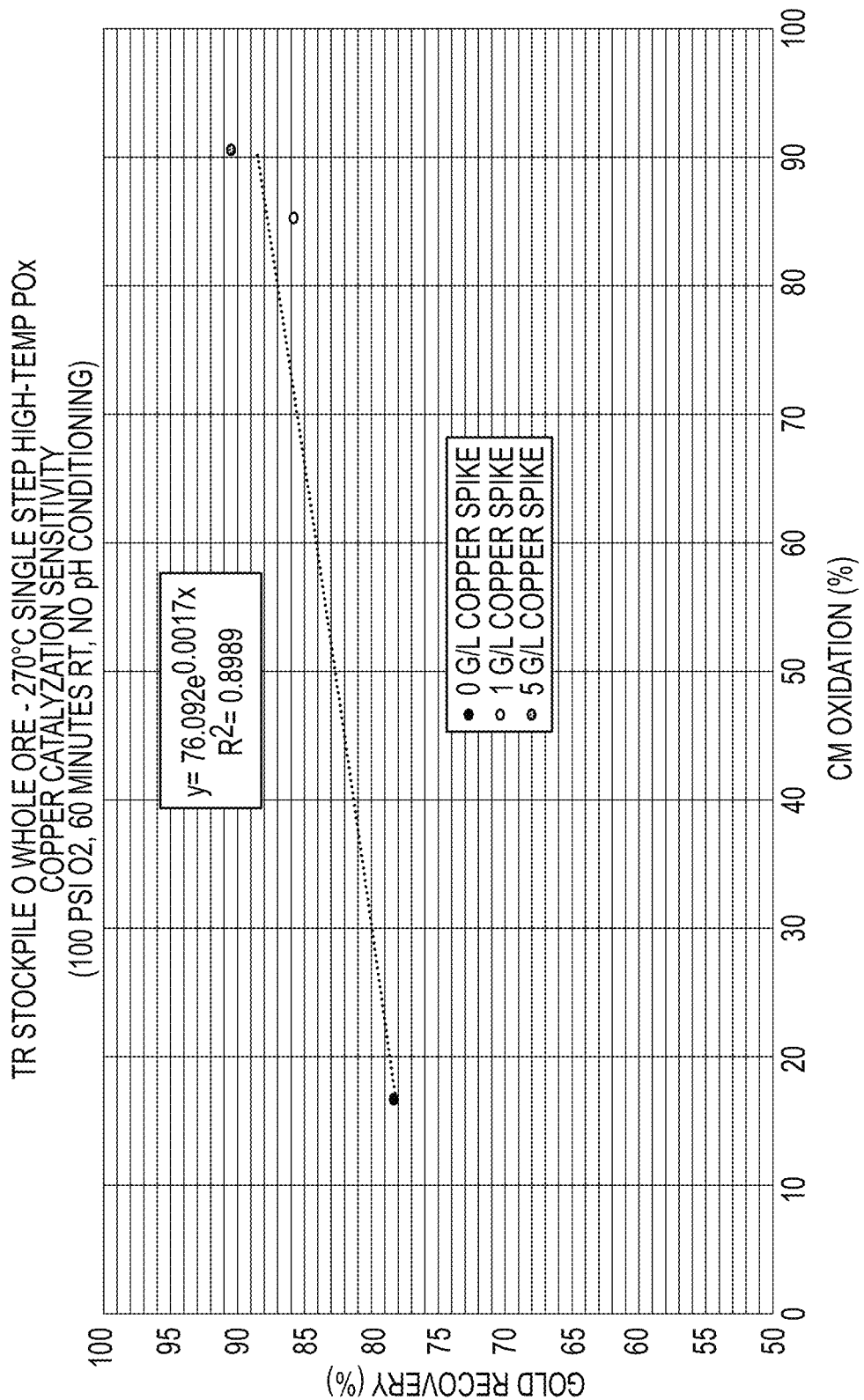

The ideal pH for high-temperature POx was found to be above the pH needed for maximum ferric solubility. Consequently, the impact of additions of cations that are more soluble at the ideal pH was investigated. FIG. 5a illustrates that there was a large jump in CM oxidation upon copper addition (copper sulfate), and a corresponding increase in gold recovery. With reference to FIG. 5b, copper sulfate was found to catalyze the oxidation rate, such that the CM oxidation target can be met at 270° C. within 60 minutes when soluble copper concentrations are above 500 ppm. Copper tests were successful with respect to organic carbon oxidation. However, residual copper forms a complex with cyanide and subsequently loads onto activated carbon in CIL, consuming some of its total metal loading capacity. The use of copper sulfate catalyst at 1 g/L Cu2+ required the removal of soluble copper sulfate from the POX discharge slurry by additional washing prior to CIL. These efforts resulted in achieving improved recoveries with reduced copper additions than originally determined. This series of tests reveals an opportunity to co-process copper concentrate with double refractory gold whole ore for a dual-metal POx flowsheet.

The advantage of catalyzation is that the CM oxidation can occur at lower temperatures within 60 minutes (which is a reasonable limit for POx RT given reactor CAPEX).

Another option for processing double refractory ores through POX is to have dual-stage flowsheets: the first stage conditions would be selected to oxidize sulfides whereas the second stage conditions would be selected to oxidize organic carbon. This would thereby reduce the retention time required at high temperature and theoretically allow for a pipe reactor to treat ore in a second stage. A two-stage oxidation process in which the arsenian pyrite is oxidized in the initial step at a temperature ranging from 180 to 225° C. and the CM is oxidized in the final step at a higher temperature yields a similar % CM oxidation when compared to the single-stage oxidation process, but with the RT reduced by half at the higher temperature. Kinetic data suggests that the high temperature POX retention time can be reduced by half with the first stage POX occurring at 225° C. for 60 minutes. Gold recovery followed closely with the extent of organic carbon oxidation similarly to single stage POX.

Figure 10:
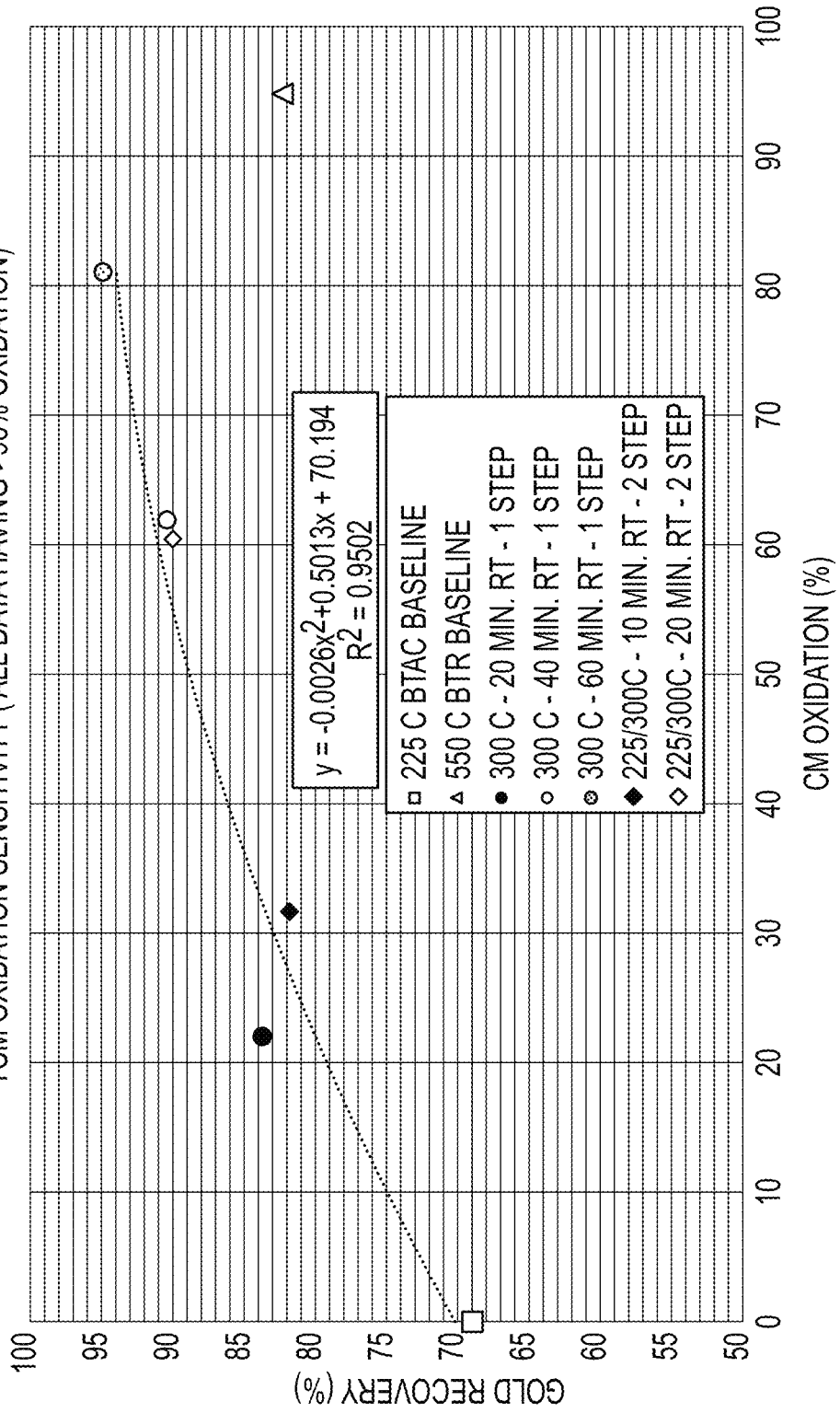
FIG. 10 is a plot of gold recovery (%) (vertical axis) against TCM oxidation (%) (horizontal axis) during testing of selected double refractory whole ore having a $P_{80}$ of 20 microns at 300° C.) at 50 psi molecular oxygen partial pressure with no pH conditioning.

FIG. 10 provides a comparison of the single-stage versus dual-stage processes. The first step of the dual-stage process creates soluble multi-valent cations that, in addition to dissolved oxygen, are electron receptors at the CM surface present at time zero for the higher-temperature, second step. The dissolved oxygen in the POx solutions continuously re-oxidizes the soluble cations to a higher valence state to sustain the enhanced kinetic rate.

Figure 11:
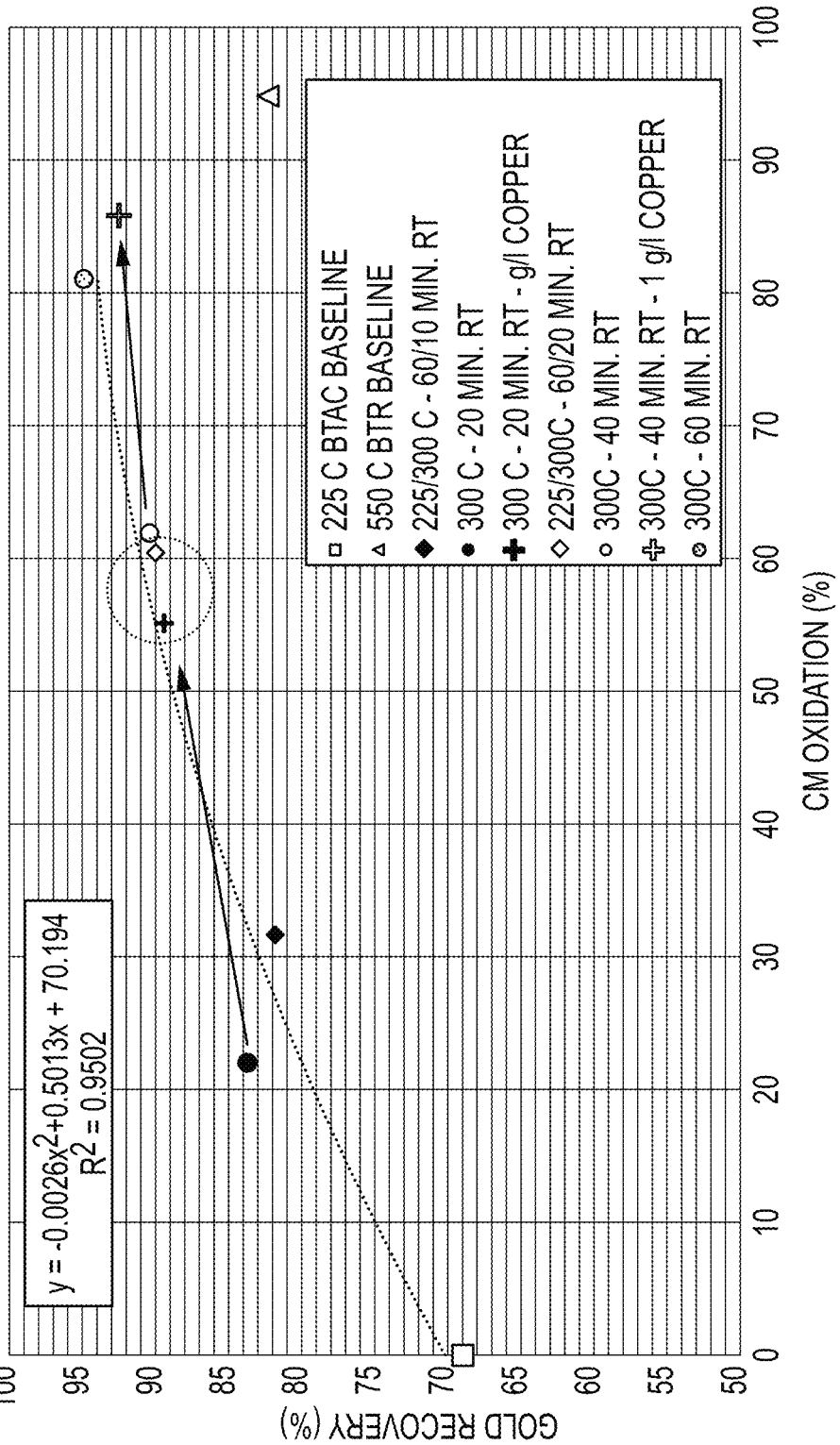
FIG. 11 is a plot of gold recovery (%) (vertical axis) against CM oxidation (%) (horizontal axis) during testing of selected double refractory whole ore having a $P_{80}$ of 20 microns at 300° C.) at 50 psi molecular oxygen partial pressure with no pH conditioning to determine sensitivity to staged treatment or copper catalyzation.

FIG. 11 illustrates that the carbon oxidation kinetics are comparable either with dual-stage treatment or by copper catalyzation using a single-stage treatment.

The study highlighted that nearly complete sulfide and CM is possible within 15 seconds at 650° C. in a supercritical water reactor.

It was desired to increase kinetics of the organic carbon oxidation step within the dual-stage POX process. Hydrogen peroxide has been well studied within the literature and is known to rapidly oxidize minerals, especially since peroxide would not be limited to gas-liquid mass transfer rates as is the case with oxygen. From the tests performed below in FIG. 13, it was evident that peroxide (or subsequent compounds formed after adding peroxide—such as Fenton's reagent) was more reactive on the surfaces of organic carbon, thus, reducing POX retention time. Peroxide was added at 150% in excess of the stoichiometric required amount. Although this is a high addition for operations, it was desired to test whether catalytic effects were present; peroxide optimization was not a focus at this phase of work.

Figure 13:
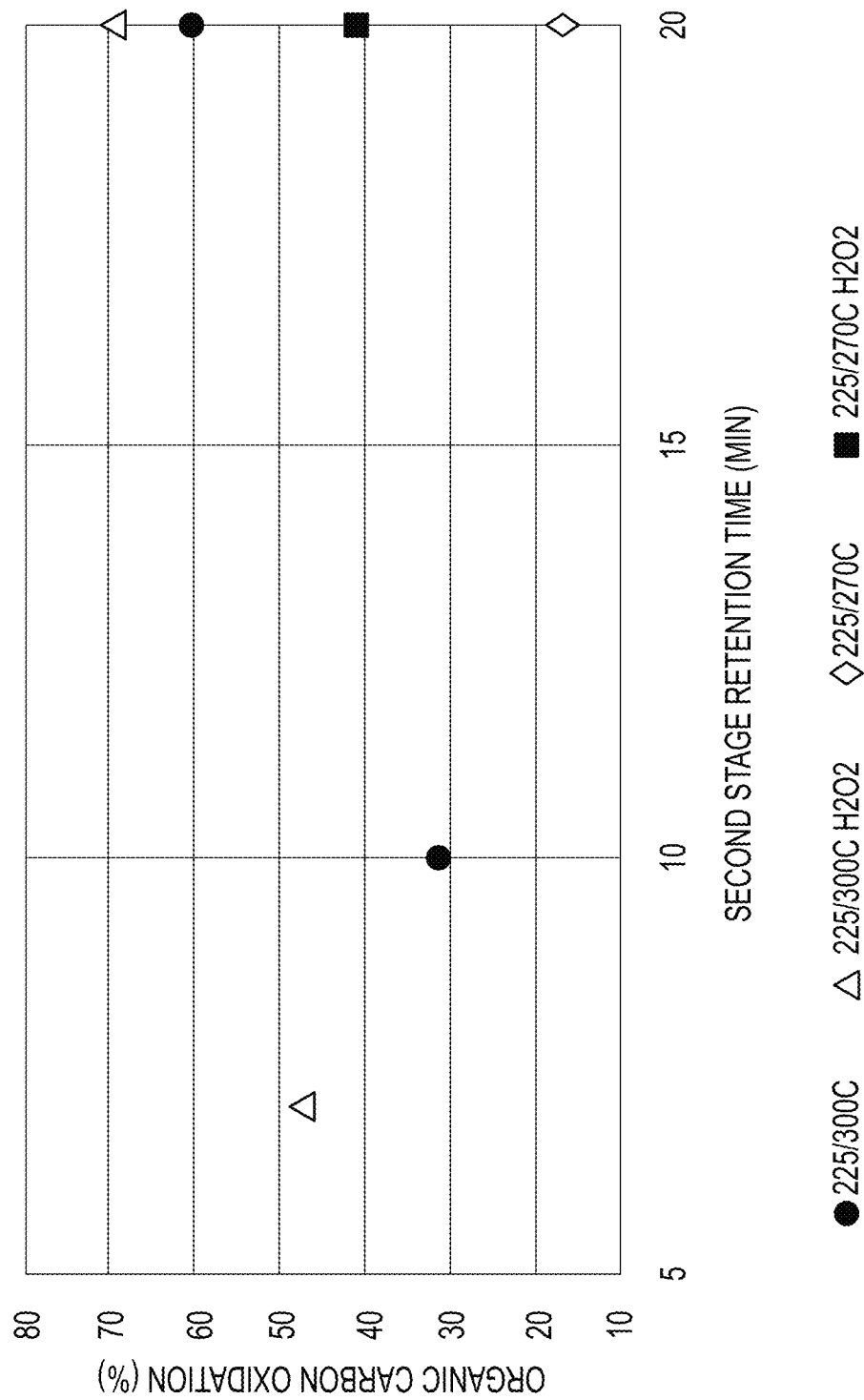
FIG. 13 is a plot of organic carbon oxidation (vertical axis) vs second stage retention time (horizontal axis)

FIG. 13 illustrates the difference between dual-stage POX with and without peroxide addition for 270 and 300° C. second stage temperatures for different retention times. These limited results are indicative of the potential use of Advanced Oxidation Processes (AOPs) for the second step.

Calculations indicate that the hydrogen peroxide was either decomposed due to thermolysis or consumed by oxidation processes within fifteen seconds after its addition at elevated temperature. Undoubtedly, some of the hydrogen peroxide produced molecular oxygen under these conditions rather than the target hydroxyl radical needed for rapid oxidation of carbonaceous matter. When using Advanced Oxidation Process (AOP) oxidants the second-stage treatment flowsheet may utilize a set of CSTRs after POX and before CIL. This configuration would mimic a short hot cure in gold processing flowsheets. An economic trade-off study would need to investigate whether AOP treatment is worthwhile.

Residual CM after POx pretreatment was found to reduce gold recovery from TR Stockpile O ore by two mechanisms:
    Loss due to encapsulation of gold bearing-species by residual CM
    Loss due to adsorption of cyanide-soluble gold by residual CM The gold deported to the grains dominated or containing CM appears to be associated with gold colloids or fine-grained pyrite that are encapsulated within the grains. The gold species may be unavailable for CIL recovery after POx at 225° C. because of continued encapsulation or absorption. Gold recovery can be further complicated by the chloride effect in which chloride solubilizes gold which then either reduces or adsorbs onto preg-robbing carbonaceous matter. This gold is certainly amenable to leaching and recovery after oxidization of the CM during high-temperature POx. The high temperature pressure oxidation process of this disclosure can afford to have higher chloride concentrations in solution because the CM is successfully oxidized.

Figure 6A:
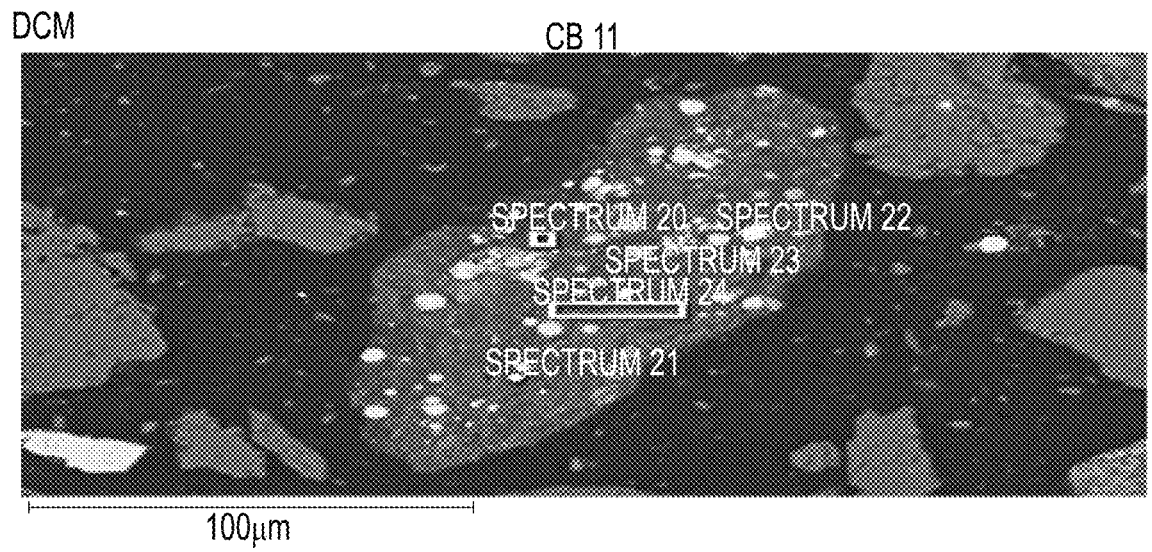
FIG. 6A is a magnified view of a double refractory whole ore particle showing a disseminated CM grain having encapsulated framboidal pyrite particles.
Figure 6B:
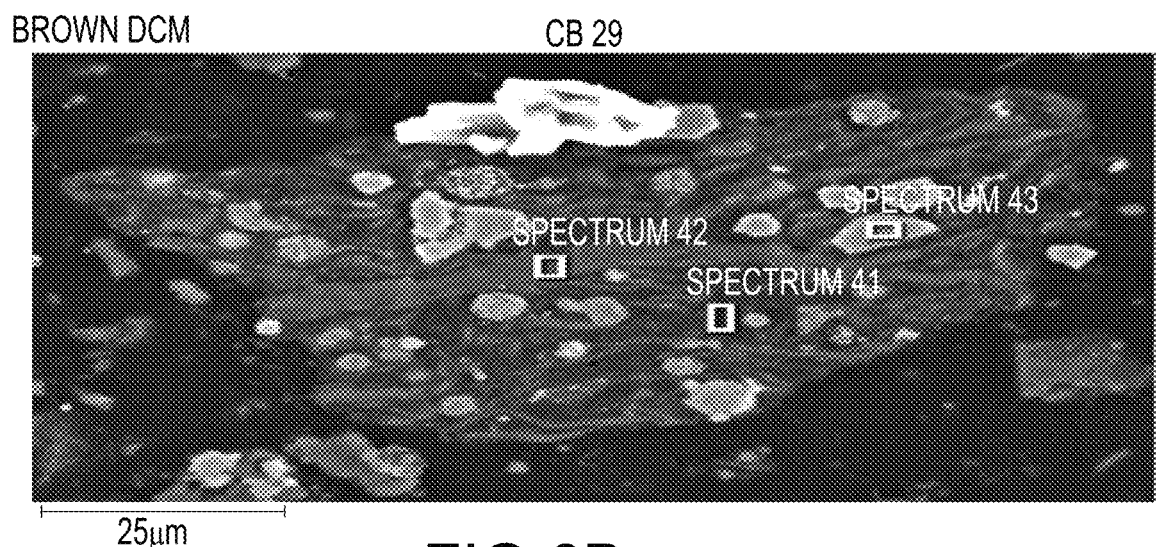
FIG. 6B is a magnified view of a double refractory whole ore particle showing a disseminated CM grain having encapsulated framboidal pyrite particles.
Figure 7B:
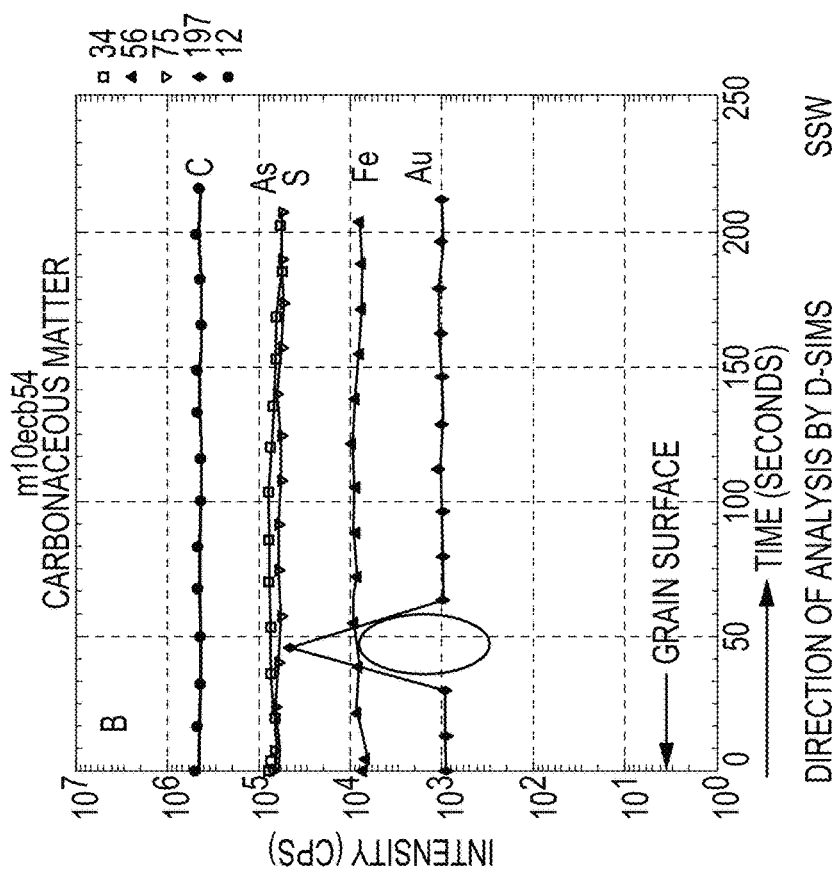
FIG. 7B is a profile plot of intensity (cps) (vertical axis) against time (seconds) (horizontal axis to illustrate sub-microscopic gold, carbon, arsenic, sulfur, and iron in a grain of CM, with a content of solid solution gold being about 129 ppm and colloidal gold being about 904 ppm.
Figure 7A:
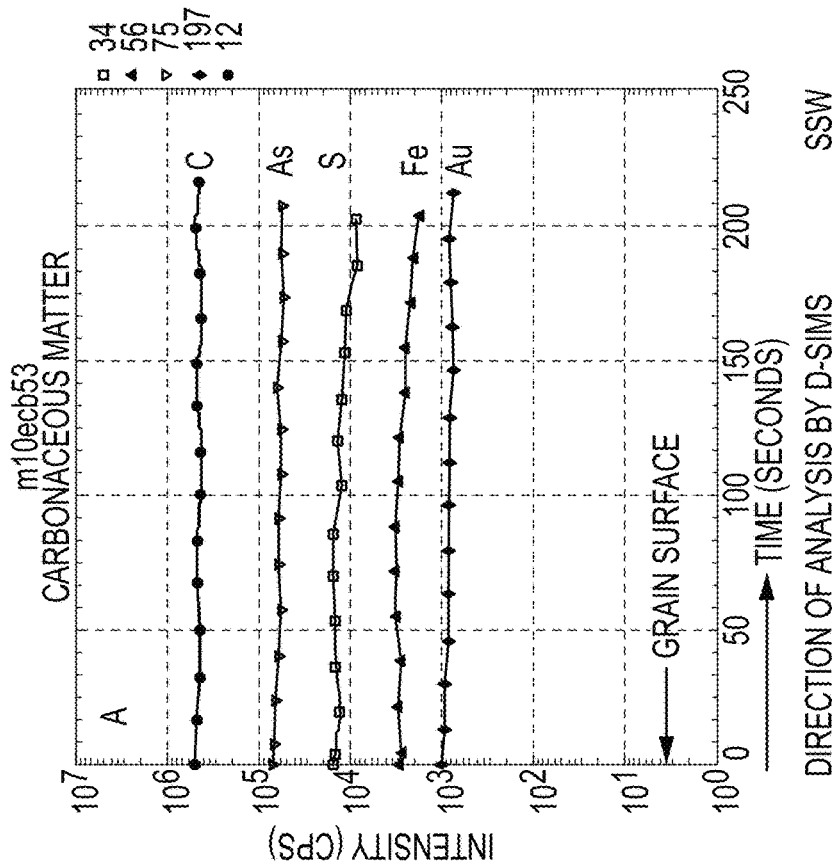
FIG. 7A is a profile plot of intensity (cps) (vertical axis) against time (seconds) (horizontal axis to illustrate sub-microscopic gold, carbon, arsenic, sulfur, and iron in a grain of CM, with a content of solid solution gold being about 129 ppm and colloidal gold being about 904 ppm.
Figure 8:
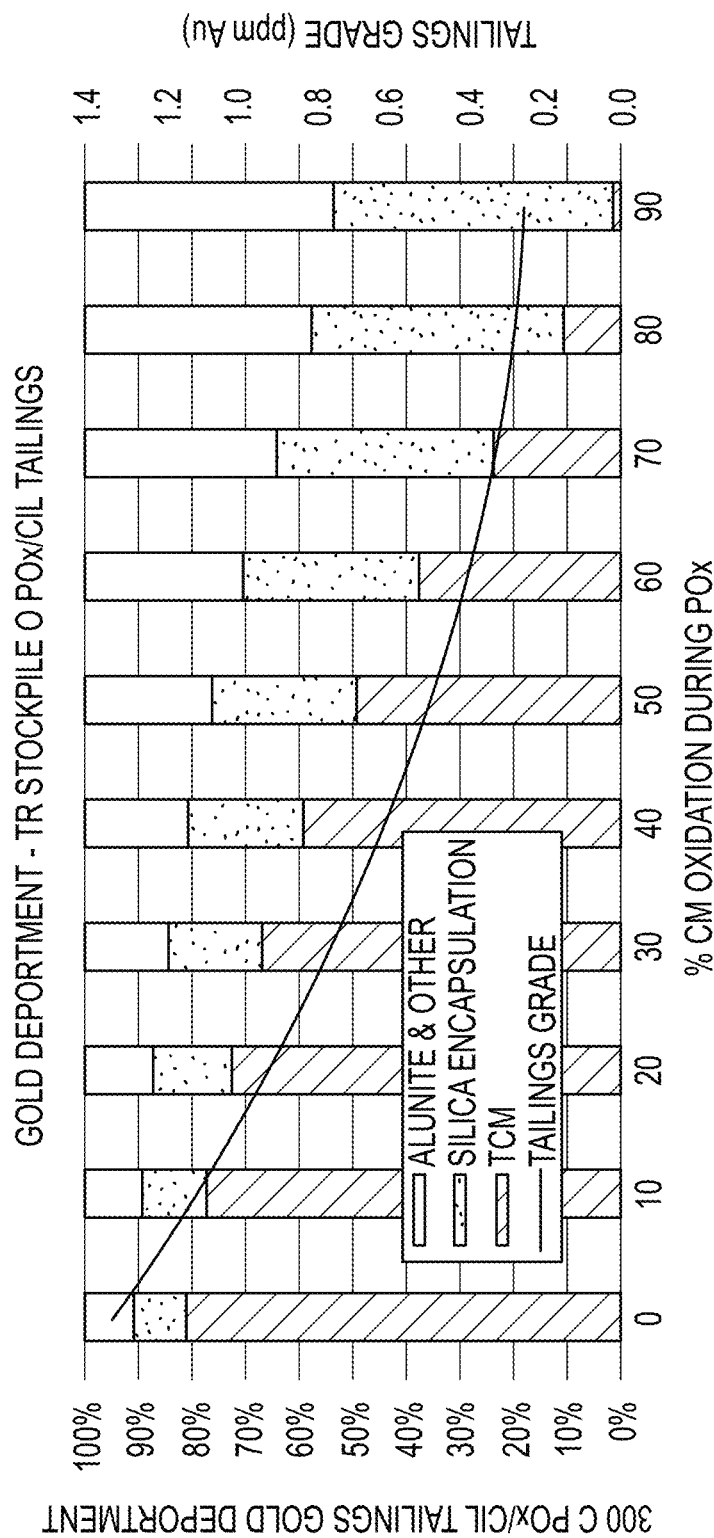
FIG. 8 is a plot of 300° C. pressure oxidation or POx/CIL tailings gold deportment (%) or tailings grade (ppm Au) (vertical axes) against percent CM oxidation during POx (%) (horizontal axis)

FIGS. 6A and 6B are typical examples of CM grains having pyrite encapsulated within the grains, and FIGS. 7A and 7B show the gold profile at depth within the grains. During cyanidation, the gold that is deported to sulfide grains is easily leached from the iron oxides produced during POx at 225° C. However, a certain amount of this leached gold is adsorbed onto CM during CIL. The incremental oxidation of CM during high-temperature POx with increases in RT provides a unique opportunity to estimate the gold loss to residual CM. FIG. 8 illustrates a typical gold deportment by category for various levels of CM oxidation.

Generation of the deportment utilized a fixed value for the gold encapsulated by naturally occurring silicates including quartz. This value is estimated by applicant's standard silica encapsulation diagnostic leach on the head sample.

The deportment also utilized a fixed value for the gold encapsulated by alunite and other man-made minerals during POx. This value is estimated by subtracting the silica encapsulation value from the projection of CIL tailings grade regression curve at 100% CM oxidation.

Once these values are estimated, the fraction of gold associated with residual CM was calculated by difference.

Figure 9:
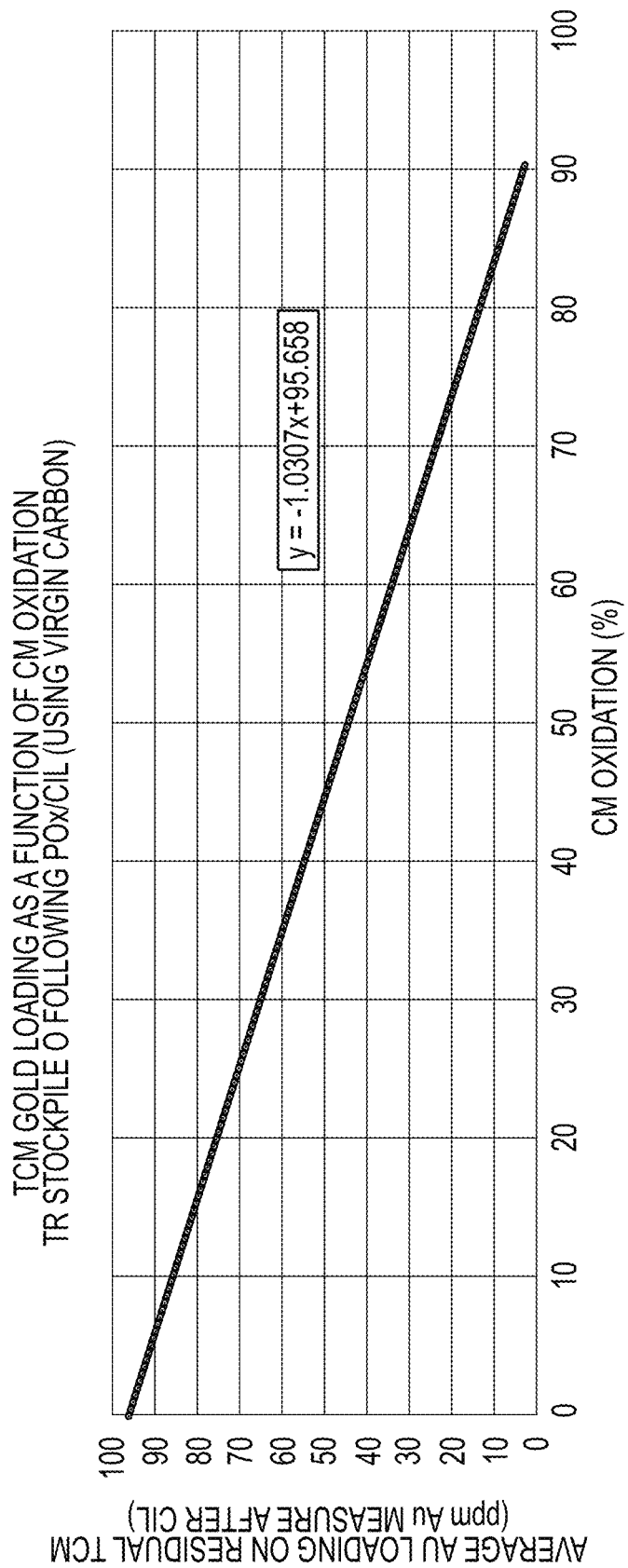
FIG. 9 is a plot of average gold loading on residual CM (ppm Au measure after CIL) (vertical axis) against CM oxidation (%) (horizontal axis) during testing of selected double refractory whole ore having a $P_{80}$ of 20 microns.

The data can also yield an estimate of gold loading on residual CM as is provided in FIG. 9. The interpretation is that as the CM oxidation proceeds to completion, the make-up of the residual CM becomes increasingly graphitic. The increasingly graphitic CM is less able to compete with activated carbon during CIL, leading to a reduced gold concentration on the remaining CM.

The gold that is deported to sulfide grains is easily leached from the iron oxides produced during POx at 225° C. However, a certain amount of this leached gold is adsorbed onto CM during CIL.

Figure 14:
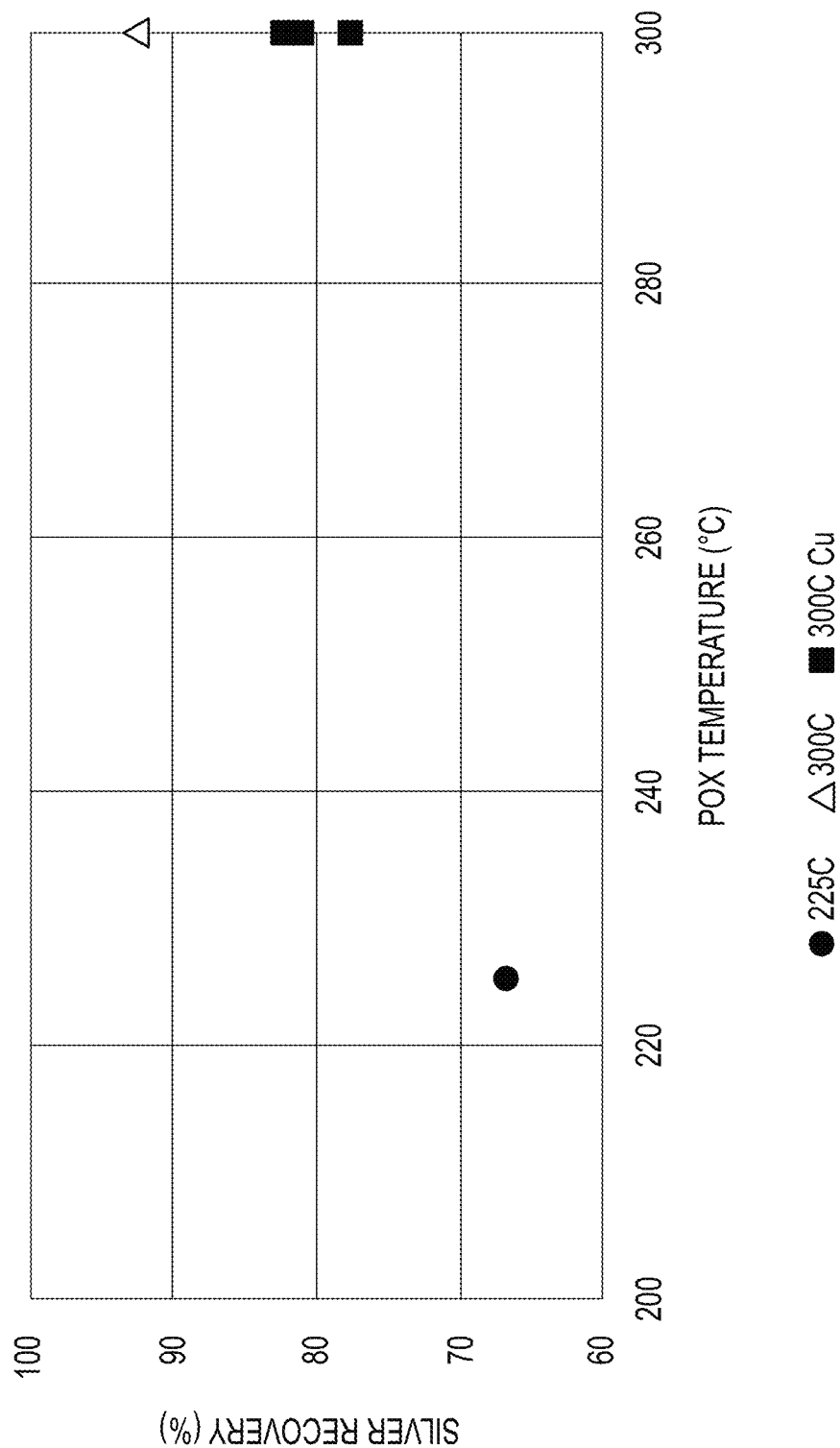
FIG. 14 is a plot of silver recovery (vertical axis) vs POX temperature (horizontal axis)

Silver recovery was also investigated with high-temperature POX to determine if there were additional advantages in other revenue streams. The 300° C. test results show an improvement over baseline tests, as shown in FIG. 14. In addition, hematite formation is favored over jarosite during POX at high temperatures, potentially eliminating the need for lime boil. However, test results are limited and require more data points with elevated silver contents.

Most POX discharge solutions contained low arsenic concentrations with an average of approximately 100 mg/L. Assay of the CIL solid residues also confirm the majority of arsenic reporting to the solids, with the average value being over 2,000 g/t. The only exceptions to this were the high copper addition tests. When copper additions were at or above 5 g/L Cu2+, POX discharge solutions surged above 1,000 mg/L As and resulting CIL residues were below 1,400 g/t As. The higher additions of copper sulfate likely caused iron to precipitate as hematite leaving less iron in solution to precipitate arsenic as a ferric arsenate. XRD results show an increasing hematite content as copper sulfate addition is increased.

High-temperature POX resulted in successful sulfide and organic carbon oxidations for TR Stockpile O ore. Gold recovery improved drastically at 270-300° C. in comparison to baseline conditions at 225° C. However, control of the POX discharge pH within a range of 1.5-1.7 was required to avoid undesired muscovite dissolution and subsequent alunite formation at the elevated temperatures.

Gold recoveries approached the technical limit of 96-97% when organic carbon oxidation was above 80%. Approximately 3-4% of the gold in this ore is locked in fine silicates. A close relationship was found between gold recovery and organic carbon oxidation for various high temperature POX test conditions.

The best results were achieved at 300° C. for 60 minutes. Copper sulfate was confirmed to accelerate organic carbon oxidation rates during high-temperature POX potentially reducing the retention time to 40 minutes.

Dual-stage POX was found to be successful with the first stage reducing the retention time needed at the elevated second stage temperature by half and moving toward compatibility with a pipe reactor design. Hydrogen peroxide additions led to increased kinetics and showed promise for further investigation of AOPs at lower temperatures.

Several variations and modifications of the disclosure can be used. It would be possible to provide for some features of the disclosure without providing others. The present disclosure, in various embodiments, configurations, or aspects, includes components, methods, processes, systems and/or apparatus substantially as depicted and described herein, including various embodiments, configurations, aspects, subcombinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   providing a slurried feed, comprising (i) in a solid phase, a refractory sulfide-containing material, the refractory sulfide-containing material comprising at least about 0.05 oz/tonne of a precious metal, at least about 0.75 wt. % sulfides, optionally at least about 0.1 wt. % feldspar, and at least 0.3 wt. % preg-robbing organic carbonaceous material;
   oxidizing at least most of the preg-robbing organic carbonaceous material to form an oxidized precious metal-containing material, wherein at least one of the following is performed during oxidizing:
   (a) maintaining a pH in the slurried feed of at least about pH 1.5;
   (b) maintaining at least about 98.5% of the feldspar in the solid phase;
   (c) maintaining a dissolved multi-valent ion concentration in the slurried feed of at least about 0.25 g/L, the dissolved multi-valent ion comprising one or more of iron, vanadium, boron, copper, nickel, manganese, and chromium;
   (d) maintaining the slurried feed under supercritical water operating conditions;
   (e) contacting the preg-robbing organic carbonaceous material in the slurried feed with a solid phase homogenous or heterogenous catalyst comprising one or more of a rare earth and a multi-valent transition metal; and
   (f) maintaining a halogen concentration in the slurried feed of more than about 100 ppm; and
   thereafter recovering the precious metal from the oxidized precious metal-containing material to form a precious metal product and a barren residue, wherein no more than about 25% of the precious metal in the refractory sulfide-containing material remains in the barren residue.

2. The method of claim 1, wherein (a) is performed during oxidizing.

3. The method of claim 1, wherein (b) is performed during oxidizing.

4. The method of claim 1, wherein (c) is performed during oxidizing and wherein the dissolved multi-valent ion comprises 0.5 g/L cupric ion.

5. The method of claim 4, wherein the slurried feed comprises copper sulfate.

6. The method of claim 4, wherein the precious metal comprises silver and wherein a temperature of the oxidizing is at or above 300° C.

7. The method of claim 1, wherein (d) is performed during oxidizing.

8. The method of claim 1, wherein the precious metal comprises gold and the feldspar comprises mica, wherein the oxidizing is conducted in the presence of one or more hydrogen peroxide, ozone, peroxydisulfate, permanganate, persulfate, and mixtures thereof, wherein a $P_{80}$ size of refractory sulfide-containing material is less than about 70 microns, and further comprising:
   before the oxidizing of at least most of the preg-robbing organic carbonaceous material, oxidizing the refractory sulfide-containing material at less than 240° C. and super-atmospheric pressure to convert at least most sulfide sulfur to sulfate sulfur and substantially stabilize ferric and ferrous iron in solution while oxidizing no more than about 25 mole % of the preg-robbing organic carbonaceous material.

9. The method of claim 1, wherein the precious metal comprises gold and the feldspar comprises muscovite, wherein (b) is performed, and wherein at least about 98.5% of the muscovite is maintained in the solid phase during oxidizing.

10. The method of claim 1, wherein the oxidizing is performed using wet air oxidation in the presence of an oxidizing agent and multi-valent catalyst to generate active oxygen species at a temperature ranging from about 175 to about 350° C. and a pressure ranging from about 20 to about 200 bar.

11. The method of claim 1, wherein (e) is performed during oxidizing.

12. The method of claim 11, wherein the solid-phase homogenous or heterogenous catalyst is supported.

13. The method of claim 1, wherein (f) is performed during oxidizing.

14. A method, comprising:
   providing a slurried feed, comprising (i) in a solid phase, a refractory sulfide-containing material, the refractory sulfide-containing material comprising at least about 0.05 oz/tonne of a precious metal, at least about 0.75 wt. % sulfides, optionally at least about 0.1 wt. % feldspar, and at least 0.3 wt. % preg-robbing organic carbonaceous material;
   oxidizing the refractory sulfide-containing material at less than 240° C. and super-atmospheric pressure to convert at least most sulfide sulfur to sulfate sulfur and substantially stabilize ferric and ferrous iron in solution while oxidizing no more than about 25 mole % of the preg-robbing organic carbonaceous material;
   thereafter oxidizing at least most of the preg-robbing organic carbonaceous material to form an oxidized precious metal-containing material; and
   thereafter recovering the precious metal from the oxidized precious metal-containing material to form a precious metal product and a barren residue, wherein no more than about 25% of the precious metal in the refractory sulfide-containing material remains in the barren residue.

15. The method of claim 14, wherein oxidizing of at least most of the preg-robbing organic carbonaceous material comprises maintaining a pH of at least about pH 1.5.

16. The method of claim 14, wherein oxidizing of at least most of the refractory sulfide-containing material and oxidizing of at least most of the preg-robbing organic carbonaceous material each comprises maintaining a dissolved cupric ion concentration of at least about 0.25 g/L.

17. The method of claim 14, wherein oxidizing of at least most of the preg-robbing organic carbonaceous material comprises maintaining the slurried feed under supercritical water operating conditions.

18. The method of claim 14, wherein oxidizing of at least most of the preg-robbing organic carbonaceous material comprises maintaining at least about 98.5% of the feldspar in the solid phase.

19. The method of claim 18, wherein the precious metal comprises gold and the feldspar comprises muscovite and wherein at least about 98.5% of the muscovite is maintained in the solid phase during oxidizing of the refractory sulfide-containing material.

20. The method of claim 14, wherein the oxidizing is conducted in the presence of one or more hydrogen peroxide, ozone, peroxydisulfate, permanganate, persulfate, and mixtures thereof, wherein a $P_{80}$ size of refractory sulfide-containing material is less than about 70 microns, and wherein the precious metal comprises gold and the feldspar comprises mica.

21. A method, comprising:
providing a slurried feed, comprising (i) in a solid phase, a refractory sulfide-containing material, the refractory sulfide-containing material comprising at least about 0.05 oz/tonne of a precious metal, at least about 0.75 wt. % sulfides, optionally at least about 0.1 wt. % feldspar, and at least 0.3 wt. % preg-robbing organic carbonaceous material;
oxidizing the preg-robbing organic carbonaceous material in the slurried feed to form an oxidized precious metal-containing material, wherein, during oxidizing of the preg-robbing organic carbonaceous material in the slurried feed, the slurried feed has a pH of at least about pH 1.5 and a dissolved cupric ion concentration of at least about 0.25 g/L; and
thereafter recovering the precious metal from the oxidized precious metal-containing material to form a precious metal product and a barren residue, wherein no more than about 25% of the precious metal in the refractory sulfide-containing material remains in the barren residue.

22. The method of claim 21, wherein the oxidizing comprises maintaining at least about 98.5% of the feldspar in the solid phase.

23. The method of claim 21, wherein the oxidizing comprises maintaining the slurried feed under supercritical water operating conditions.

24. The method of claim 21, further comprising, before oxidizing of the preg-robbing organic carbonaceous material, oxidizing the refractory sulfide-containing material at less than 240° C. and super-atmospheric pressure to convert at least most sulfide sulfur to sulfate sulfur and substantially stabilize ferric and ferrous iron in solution.

25. The method of claim 24, wherein the precious metal comprises gold and the feldspar comprises muscovite and wherein at least about 98.5% of the muscovite is maintained in the solid phase during oxidizing of the refractory sulfide-containing material.

26. The method of claim 21, wherein the oxidizing is conducted in the presence of one or more hydrogen peroxide, ozone, peroxydisulfate, permanganate, persulfate, and mixtures thereof, wherein a $P_{80}$ size of the refractory sulfide-containing material is less than about 70 microns, and wherein the precious metal comprises gold and the feldspar comprises mica.

27. A method, comprising:
providing a slurried feed, comprising (i) in a solid phase, a refractory sulfide-containing material, the refractory sulfide-containing material comprising at least about 0.05 oz/tonne of a precious metal, at least about 0.75 wt. % sulfides, optionally at least about 0.1 wt. % feldspar, and at least 0.3 wt. % preg-robbing organic carbonaceous material;
oxidizing the refractory sulfide-containing material at less than 240° C. and super-atmospheric pressure to convert at least most sulfide sulfur to sulfate sulfur and substantially stabilize ferric and ferrous iron in solution;
oxidizing at least most of the preg-robbing organic carbonaceous material in the slurried feed in the presence of a peroxide to form an oxidized precious metal-containing material, wherein the oxidizing of the preg-robbing organic carbonaceous material in the slurried feed is performed at an operating temperature ranging from about 50 to about 100° C.; and
thereafter recovering the precious metal from the oxidized precious metal-containing material to form a precious metal product and a barren residue, wherein no more than about 25% of the precious metal in the refractory sulfide-containing material remains in the barren residue.

* * * * *